United States Patent [19]

Coffelt et al.

[11] Patent Number: 4,910,729
[45] Date of Patent: Mar. 20, 1990

[54] ISDN TRAFFIC GENERATOR ADAPTER

[75] Inventors: Steven R. Coffelt; Thomas W. Durston, both of Camarillo, Calif.

[73] Assignee: Harris Corporation, Melbourne, Fla.

[21] Appl. No.: 192,175

[22] Filed: May 10, 1988

[51] Int. Cl.$^4$ .............................................. H04L 1/24
[52] U.S. Cl. ...................................... 370/17; 371/20.1; 371/27
[58] Field of Search ............... 370/58, 60, 110.1, 13, 370/17; 371/15, 22, 27

[56] References Cited

U.S. PATENT DOCUMENTS

| | | |
|---|---|---|
| 4,096,354 | 6/1978 | Bleickardt et al. . |
| 4,383,312 | 5/1983 | Reed . |
| 4,488,289 | 12/1984 | Turner . |
| 4,507,782 | 3/1985 | Kunimasa et al. . |
| 4,546,467 | 10/1985 | Yamamoto . |
| 4,550,403 | 10/1985 | Beynie . |
| 4,584,680 | 4/1986 | Carter et al. . |
| 4,589,106 | 5/1986 | Prather et al. . |
| 4,602,364 | 7/1986 | Herman et al. . |
| 4,616,361 | 10/1986 | Strehl . |
| 4,663,776 | 5/1987 | Wever et al. . |
| 4,682,347 | 7/1987 | Lynch . |
| 4,730,313 | 3/1988 | Stephenson et al. ............ 371/5 |
| 4,731,782 | 3/1988 | Shimizu et al. ............ 370/110.1 |

Primary Examiner—Douglas W. Olms
Assistant Examiner—Melvin Marcelo
Attorney, Agent, or Firm—Antonelli, Terry & Wands

[57] ABSTRACT

An integrated services digital network (ISDN) traffic generator adapter is provided for coupling an analog traffic generator which produces a plurality of commands and analog telephone signals to an ISDN switch. In particular, first circuits provide a plurality of two-way communication links between the analog traffic generator and the ISDN switch. Each of said first circuits includes elements for converting the analog telephone signals from the analog traffic generator into a plurality of ISDN signals, including B channel information and D channel information, for said ISDN switch, and elements for converting a plurality of ISDN signals from the ISDN switch, including B channel information and D channel information, into analog telephone signal for said analog traffic generator. A processor is coupled to the plurality of first circuits for selectively addressing individual ones of said plurality of first circuits. Also, a D channel monitor is coupled to the processor for monitoring D channel communication between the first circuits and the ISDN switch. The D channel monitor can selectively monitor D channel communication between the first circuits and the ISDN switch for individual two-way communication links between the analog traffic generator and the ISDN switch in accordance with the selection of one of the first circuits by the processor.

10 Claims, 27 Drawing Sheets

HYBRID

HYBRID

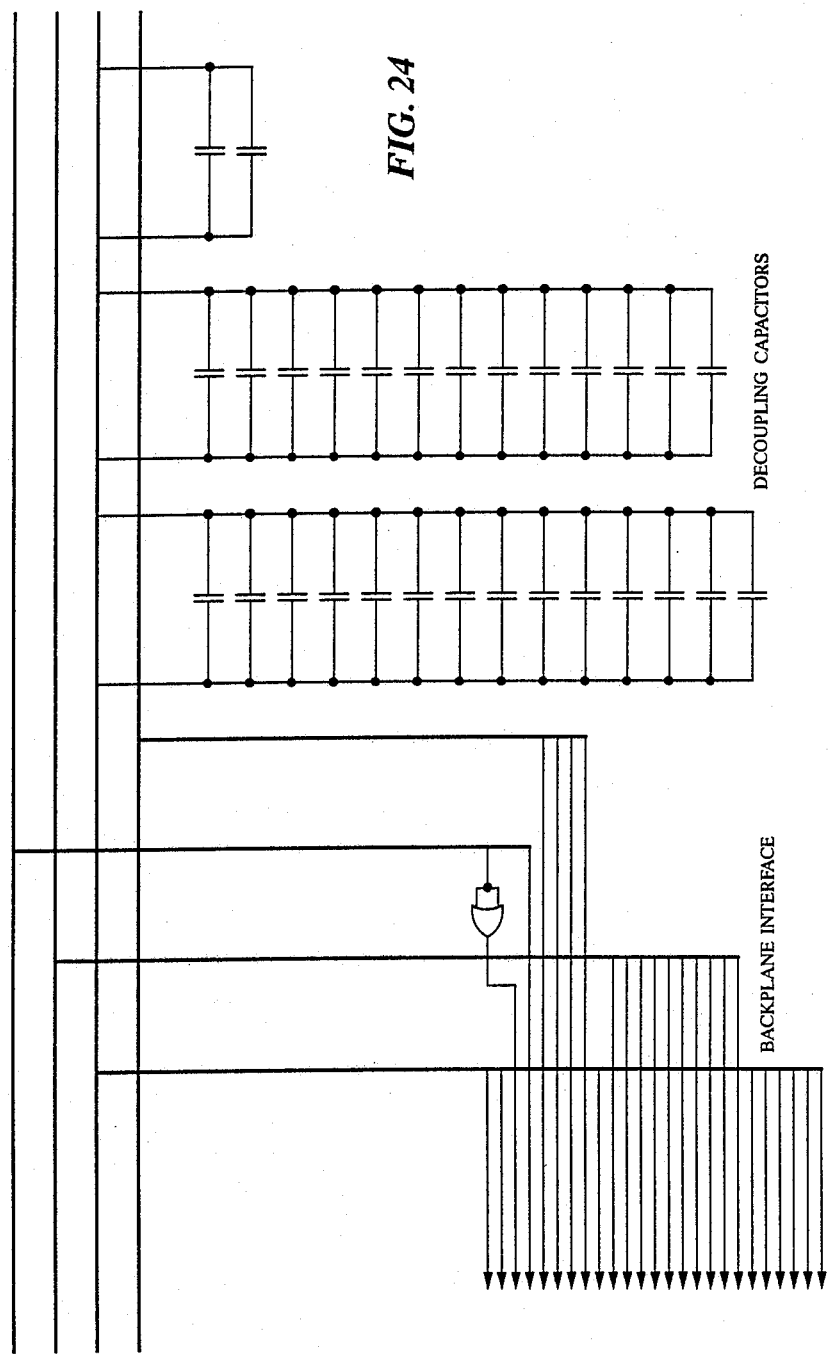

ISDN TRAFFIC GENERATOR ADAPTER

BACKGROUND OF THE INVENTION

The present invention is directed to testing of ISDN (Integrated Services Digital Network) switches (for example, at an ISDN central office), and, more particularly, to a traffic generator adapter to allow testing such ISDN switches using commercially available analog traffic generators.

ISDN is presently being promoted by telephone companies in an effort to improve quality, capacity, and variety of services. Preliminary ISDN specifications have been introduced by CCITT, the international communications standards committee. In the U.S. and Canada, subsets and minor variations of these standards are being defined by the major central office equipment vendors, such as AT & T and Northern Telecom.

The technical concept of ISDN is being accomplished by using the existing copper telephone lines to carry a digital signal instead of the usual analog voice (limited to 3000 Hz). The digital signal is transmitted at a rate of 160,000 bits per second (bps), offering two 64,000 bps channels (known as "B" channels) for voice or data calls, and one 16,000 bps channel (identified as the "D" channel) for establishing and maintaining the call connection to the network (and also used for sending data packets using the X.25 protocol) as a basic service. Implementation of ISDN requires new central office switching and transmission equipment, and sometimes dramatically different terminal equipment (e.g., telephones, modems, data terminals) at the user or subscriber end of the telephone line. At present, ISDN is starting limited technical field trials in several cities around the U.S., and is already being widely implemented in Europe.

A method was needed to test the new ISDN central office switches under simulated load conditions to make sure that they were working and could handle the number of calls expected when placed in operation. With the older style telephone switches, traffic generators were used to place a large number of calls through the switch. They would also monitor the time needed to complete the call, the quality of the connection and speed that the switch could handle simultaneous requests for service. Since the existing traffic generators were analog and the ISDN switches required a digital input, they could not be used to directly test ISDN switches. Another method was needed.

Accordingly, most of the ISDN switches now being installed includes self test capability. This function can test a large percentage of the switch hardware for proper operation including controller operation and the integrity of internal data paths. However, built-in self test equipment is not capable of providing actual inputs from external equipment. On the contrary, it only can simulate internal functions. It cannot test the response of the switch to actual off-hook and dialing signals from the customer's telephone, nor can it test the complete data path from end to end (telephone to telephone). In addition, there is no way for the customer to check that the internal self test provided by the switch manufacturer really provides a complete test of the switch. Accordingly, the present invention is directed to an adapter permitting the use of commercially available analog traffic generators to perform extensive testing of ISDN switches.

In addition, it is often necessary to identify the source of trouble in the event of problems in making or answering a voice or data call. As noted above, in basic ISDN service, the voice or data information is carried by one of two B channels on the ISDN circuit. The cell transitions to make a connection, or link, are established via the D channel. Messages sent to and from the central office on the D channel contain the information defining the status of the link. It is very important to known what part of the link activity is failing to determine if the trouble is in the local equipment or elsewhere. All D channel information may be displayed in the following formats:

1. Binary.
2. Hex.
3. Bus activation state.
4. OSI Layer 1 HDLC frames.
5. OSI layer 2 LAPD/LAPD decoder frames.
6. OSI layer 3 Q.931 and decoder X.25 frames.

The present invention also includes a D channel monitor feature to help isolate the location of any problems quickly and accurately.

FIG. 1 shows a basic ISDN terminal which the present invention can be used in conjunction with. The terminal is divided into functional groupings. By separating functions conceptually in this way, it is possible to identify and specify the interfaces between them. A description of the functional groups is as follows, noting that this description is confined to the functions of basic access.

NT1-Network Termination 1. This is the group of functions which terminate the transmission line. As such, it is seen in the CCITT recommendations as belonging to the network provided, i.e., the owner of the transmission line. The functions of the NT1 are described as:

Line transmission termination.
Line maintenance and performance monitoring.
Timing.
Power transfer, extracting power from the line to drive at least the "wake-up" portion of the terminal.
Parts of the multiplexing functions.
Termination of the T interface which may include multi-drop termination and associated contention resolution functions.

NT2-Network Termination 2. This is the group of functions which give the terminal its particular "character". An NT2 could be a PABX if access is primary, a LAN or a terminal controller. The functions of the NT2 are described as:

Protocol handling or handling that part of the protocol associated with information transfer across a network.
The higher-level parts of the multiplexing function.
Switching and concentration functions.
Maintenance functions.
Interface functions to the S and T interfaces.

The NT2 functional group may be more or less complex depending on the application. The range extends from the quite complex function of a PABX down to relatively simple functions required for a time division multiplexer. In specific, simple cases all the functions may be adequately performed by NT1, and NT2 becomes merely physical connections.

TE-Terminal Equipment. This is the device itself. It could be a digital telephone, a CADCAM workstation, a computer terminal, etc.

TE1-Terminal Equipment Type 1. Such terminal equipment complies with ISDN user-network interface recommendations and therefore supports interface S.

TE2-Terminal Equipment Type 2. Such a terminal supports the same functions but does not comply with the ISDN user-network interface recommendations. It must therefore interface with the ISDN access via a TA Terminal Adapter which converts the non-ISDN interface functions into ISDN acceptable form at reference points S or T.

This description has largely revealed the nature of the interfaces. A further description is as follows:

Reference point T (T for Terminal) Separates the network provider's equipment from the user equipment. Provides a standardized interface between equipment, sending and receiving, validating and timing information to the network and to terminal equipment devoted to the use of this information.

Reference point S (S for System) Separates the user terminal equipment from the network functions of the terminal.

Reference point R (R for Rate) Provides a non-ISDN interface between non-ISDN compatible user equipment and adapter equipment. Such an interface may well comply with one of the CCITT X series interface recommendations.

Reference point U (U for User) Interface between NT1 and the transmission line.

The terminology from FIG. 1 will be used throughout the rest of the specification. This terminology is presently well accepted standard terminology, as discussed, for example, in the textbook, "The Integrated Services Digital Network: from Concept to Application", by John Ronayne, published by John Wile & Sons, Inc., 1988, which is hereby incorporated by reference.

OBJECTS OF THE INVENTION

It is an object of the present invention to provide a testing arrangement for ISDN switches.

It is a further object of the present invention to provide a traffic generator adapter that can allow testing such ISDN switches using commercially available analog traffic generators.

Another object of the present invention is to provide a traffic generator adapter which can monitor D channel operation of the central office switches.

SUMMARY OF THE INVENTION

To achieve these and other objects, the present invention provides an ISDN traffic generator adapter to couple an analog traffic generator which produces a plurality of commands and analog telephone signals to an ISDN switch. The traffic generator adapter includes a plurality of first circuits which couple the analog traffic generator to the ISDN switch. Each of these first circuits includes a plurality of tip/ring interface circuits, a processor and a plurality of S interface circuits. In particular, each of the tip/ring interface circuits can include means for detecting commands from the analog traffic generator and providing a message to the processor upon receipt of these commands. The tip/ring interface circuits further include an arrangement to convert the analog telephone signals from the traffic generator into ISDN B channel signals to be provided to the S interface circuits. The tip/ring interface circuits also include an arrangement to convert B channel signals received from the S interface circuitry into analog tip/ring signals to be provided to the traffic generator. The processor in each of said first circuits includes means to receive the messages from the tip/ring interface circuit and means for generating D channel signals to be provided to the S interface circuits. The processor also includes an arrangement to receive, act on and store D channel signals received from the ISDN switch through the S interface circuitry. Each of the S interface circuits includes an arrangement to combine the B channel signals received from the tip/ring interface with D channel signals from the processor to provide desired ISDN signals to the ISDN switch. Correspondingly, the S interface circuitry also includes means to receive ISDN signals from the switch and to provide B channel signals based thereon to the tip/ring interface circuitry and to provide D channel signals based thereon to the processor.

In addition to the processor circuitry in the first circuits, a second processor circuit is provided which is coupled to the plurality of first circuits. The second processor includes an arrangement to selectively address individual ones of the processors of the first circuits. This can be used in conjunction with a D channel monitoring arrangement to control selection of predetermined ones of the processors of the first circuits so that D channel information from the ISDN switch stored in the selected processors can be individually monitored by the D channel monitor.

BRIEF DESCRIPTION OF THE DRAWINGS

FIG. 1 shows a block diagram of a basic ISDN terminal which the present invention can be used in conjunction with;

FIGS. 6 to 24 show detailed schematic circuitry for the block diagrams of FIGS. 2 to 5.

DETAILED DESCRIPTION

Figure 2:
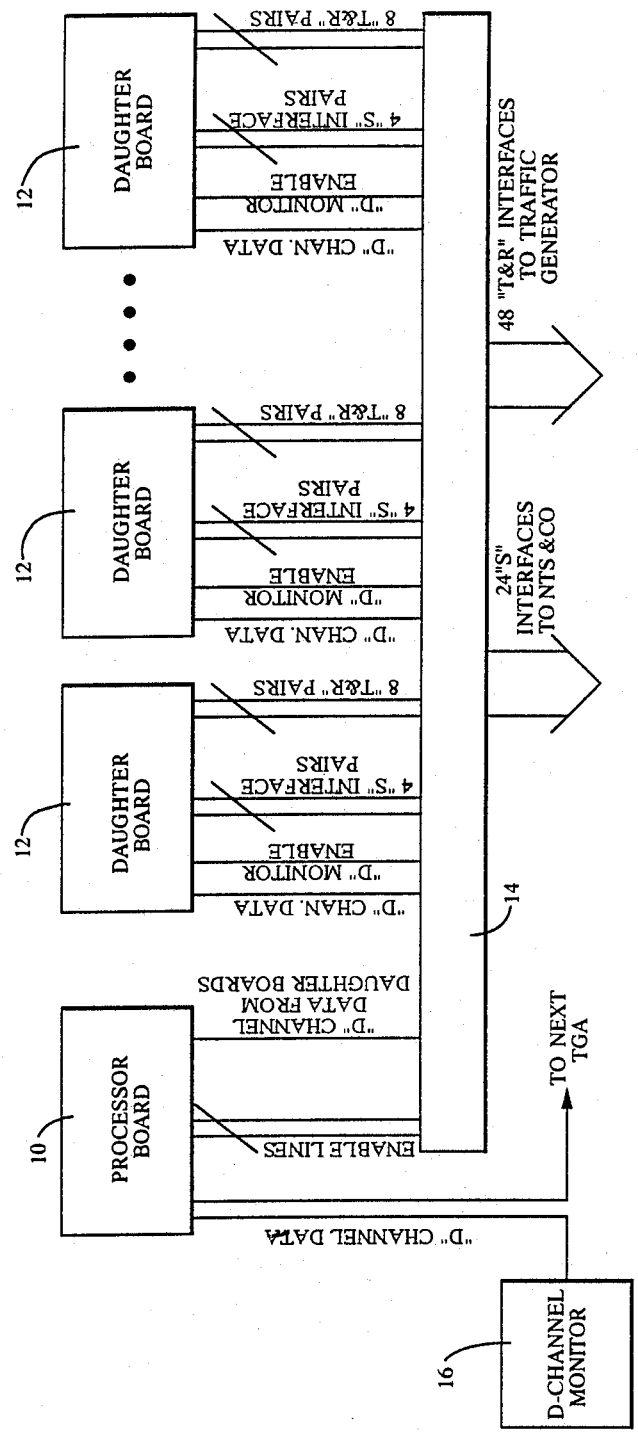
FIG. 2 is a block diagram showing an embodiment of a traffic generator adapter in accordance with the present invention.
Figure 5:
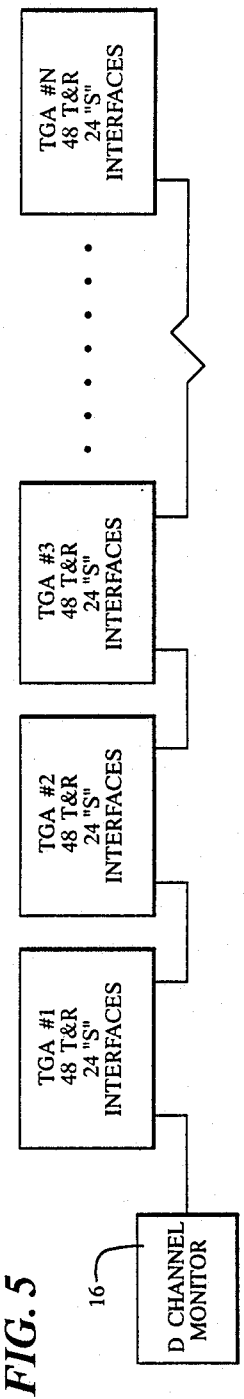
FIG. 5 is a block diagram showing a single D channel monitor for a plurality of traffic generator adapters.
Figure 6:
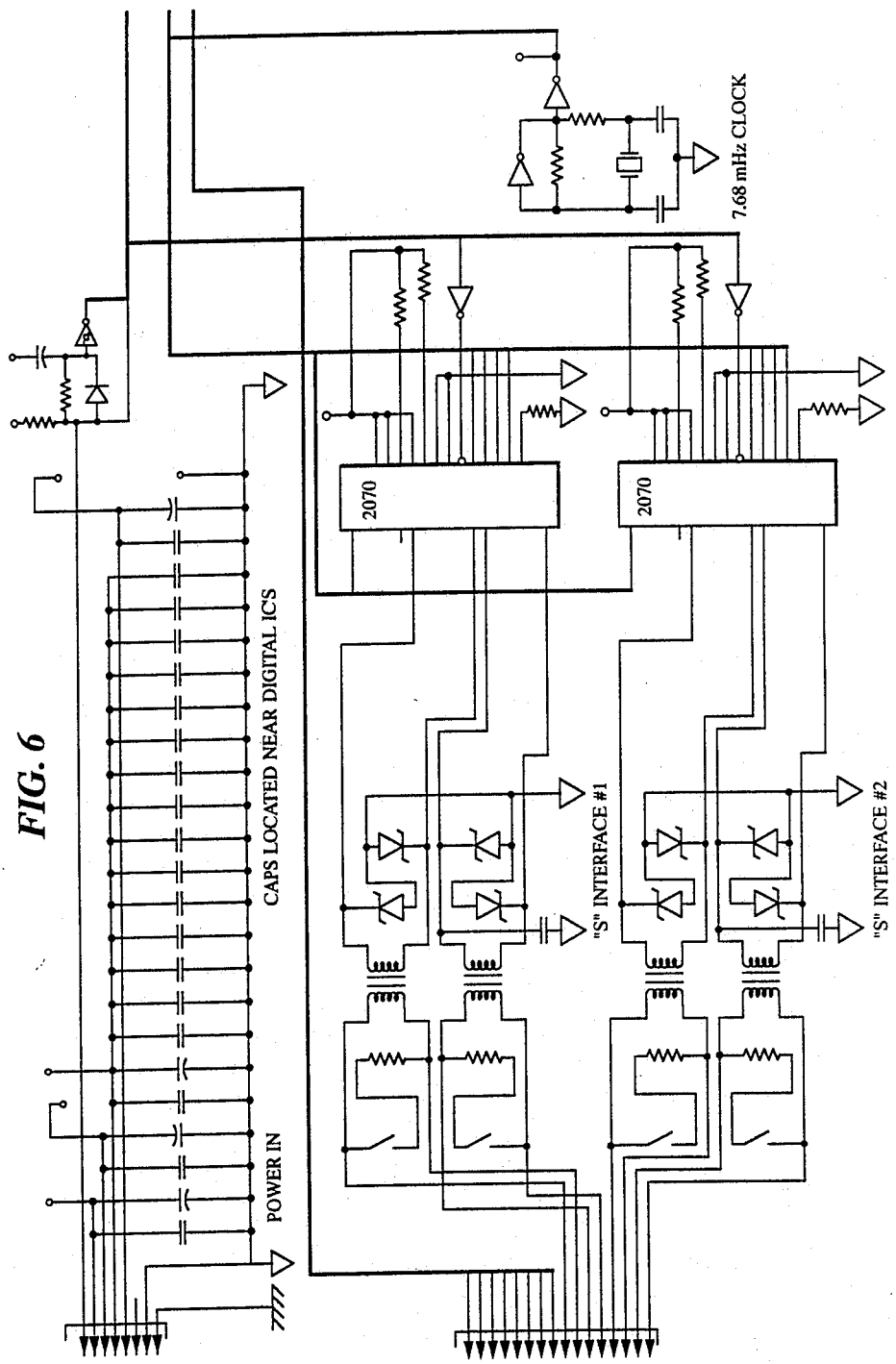
Figure 7:
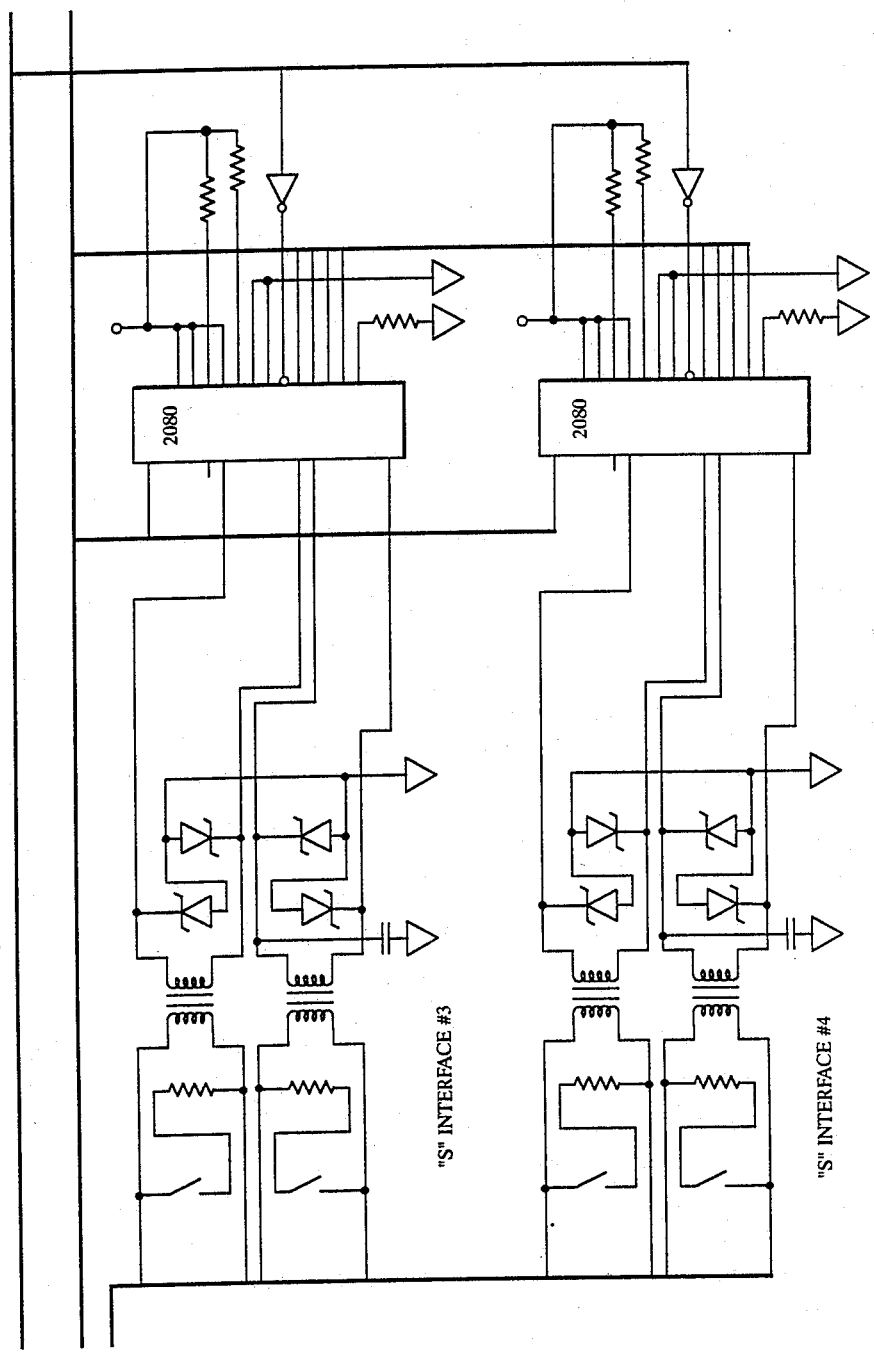
Figure 8:
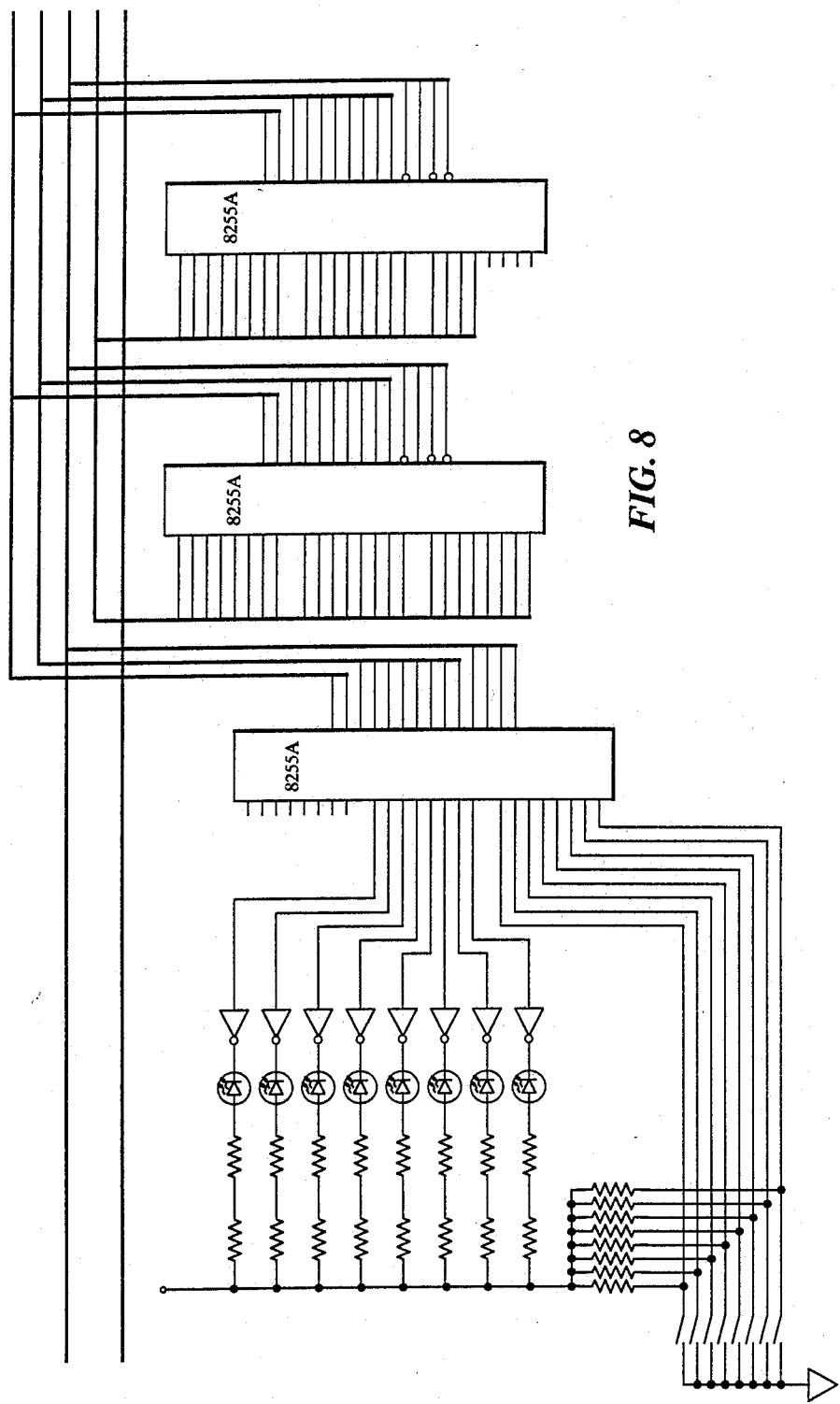
Figure 9:
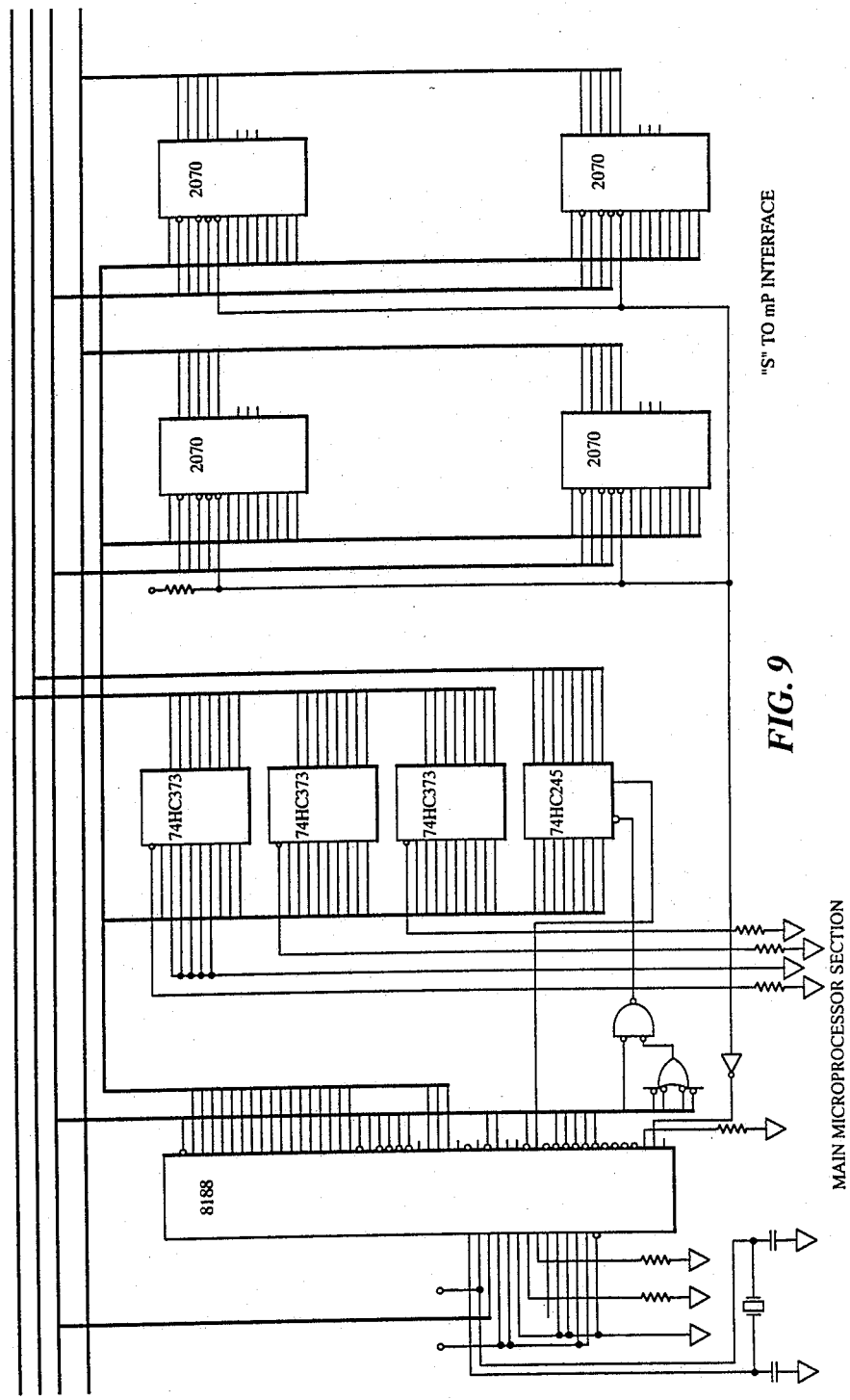
Figure 10:
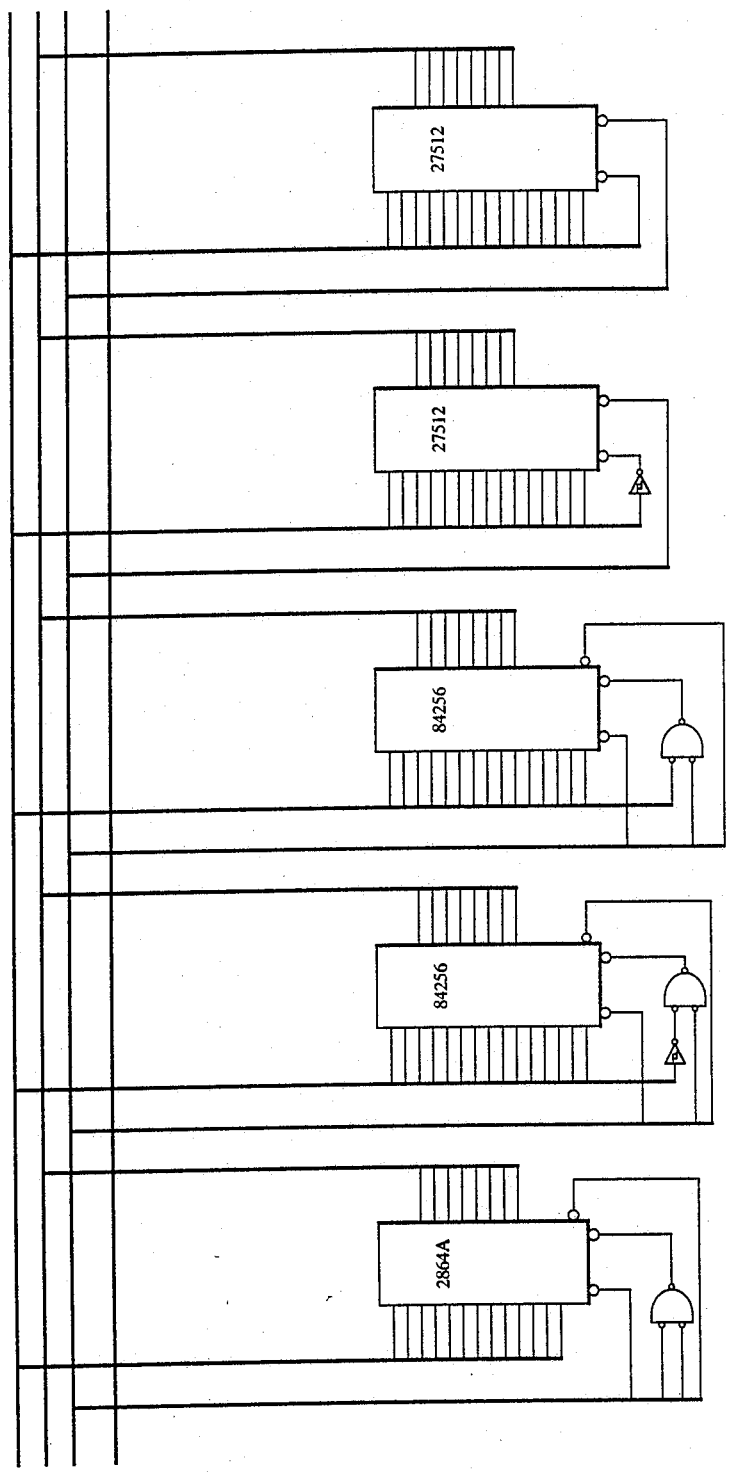
Figure 11:
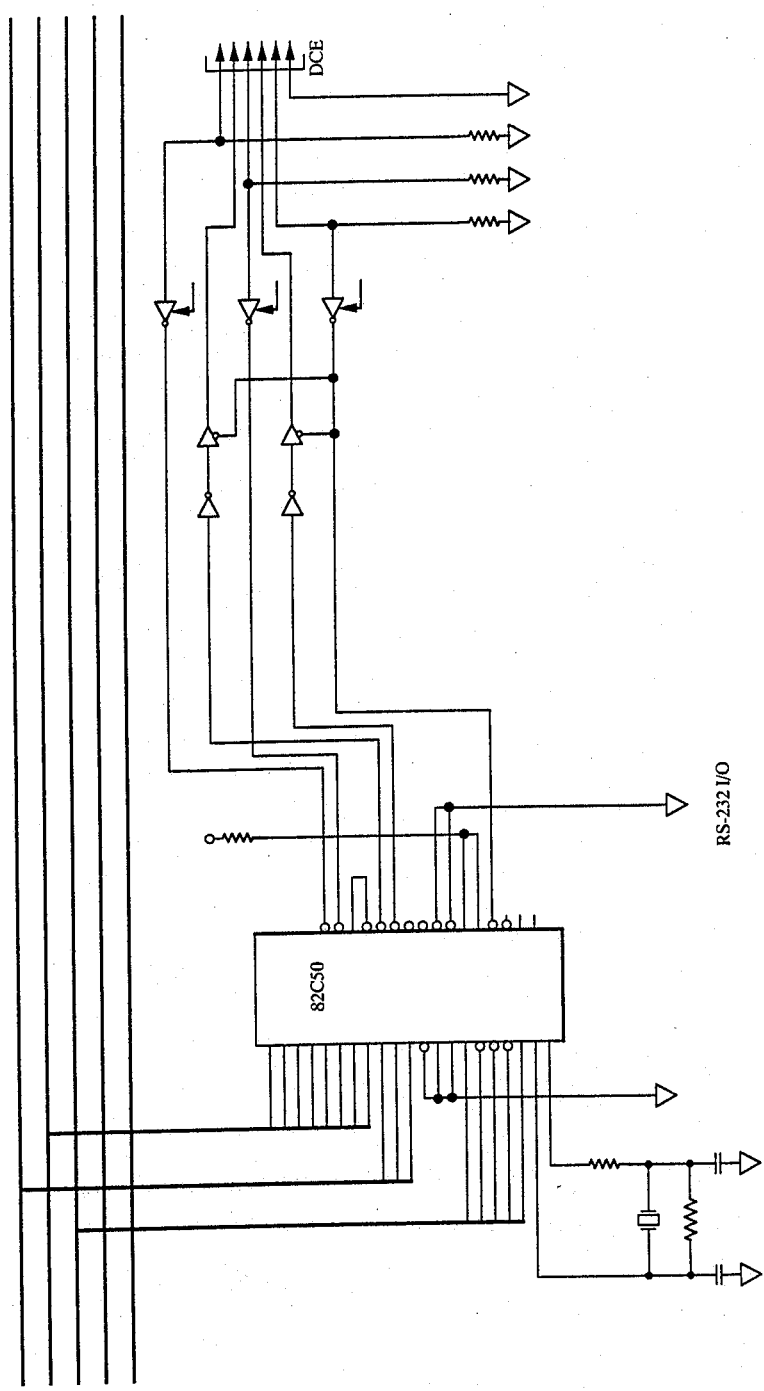
Figure 12:
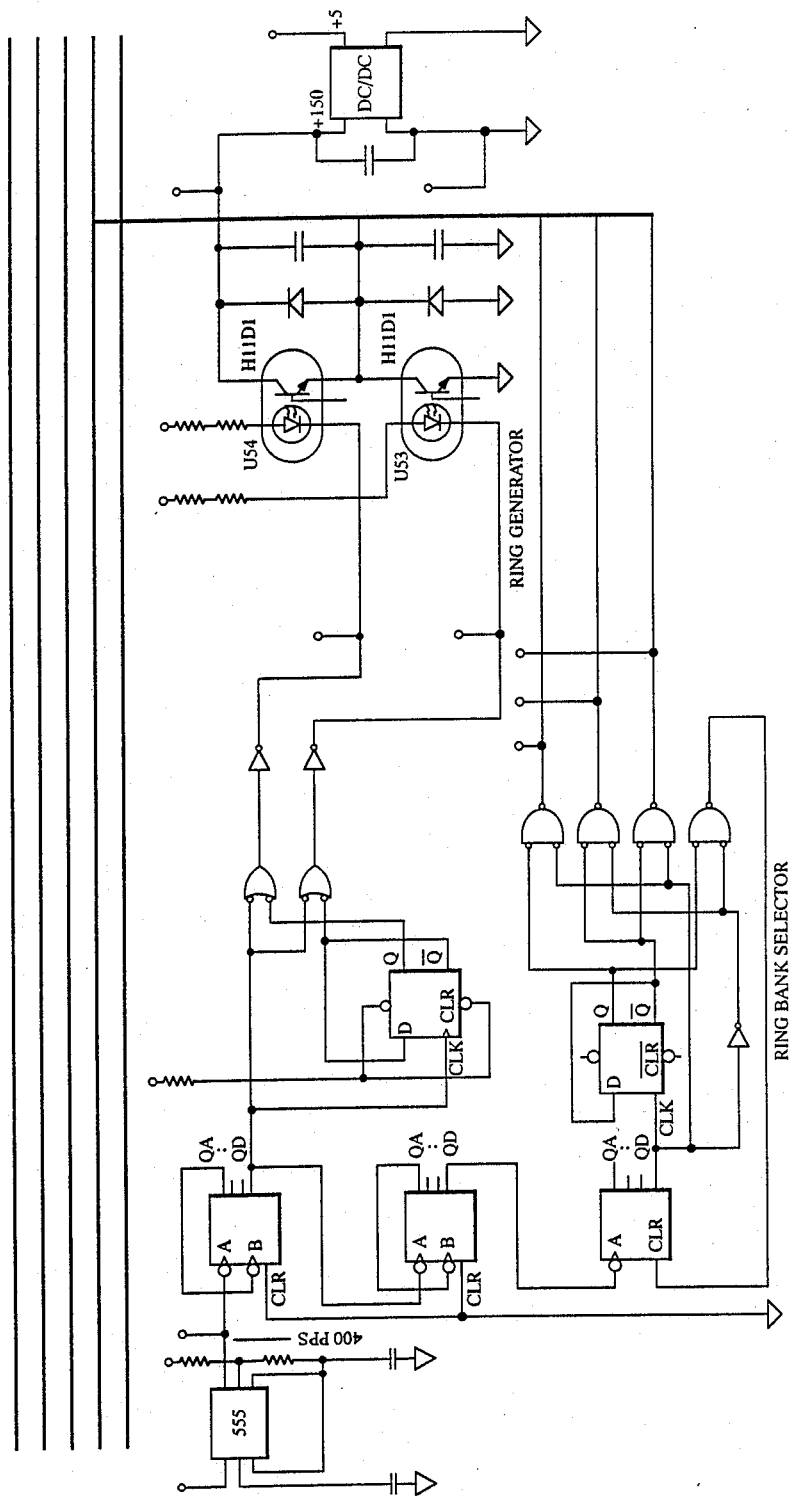
Figure 13A:
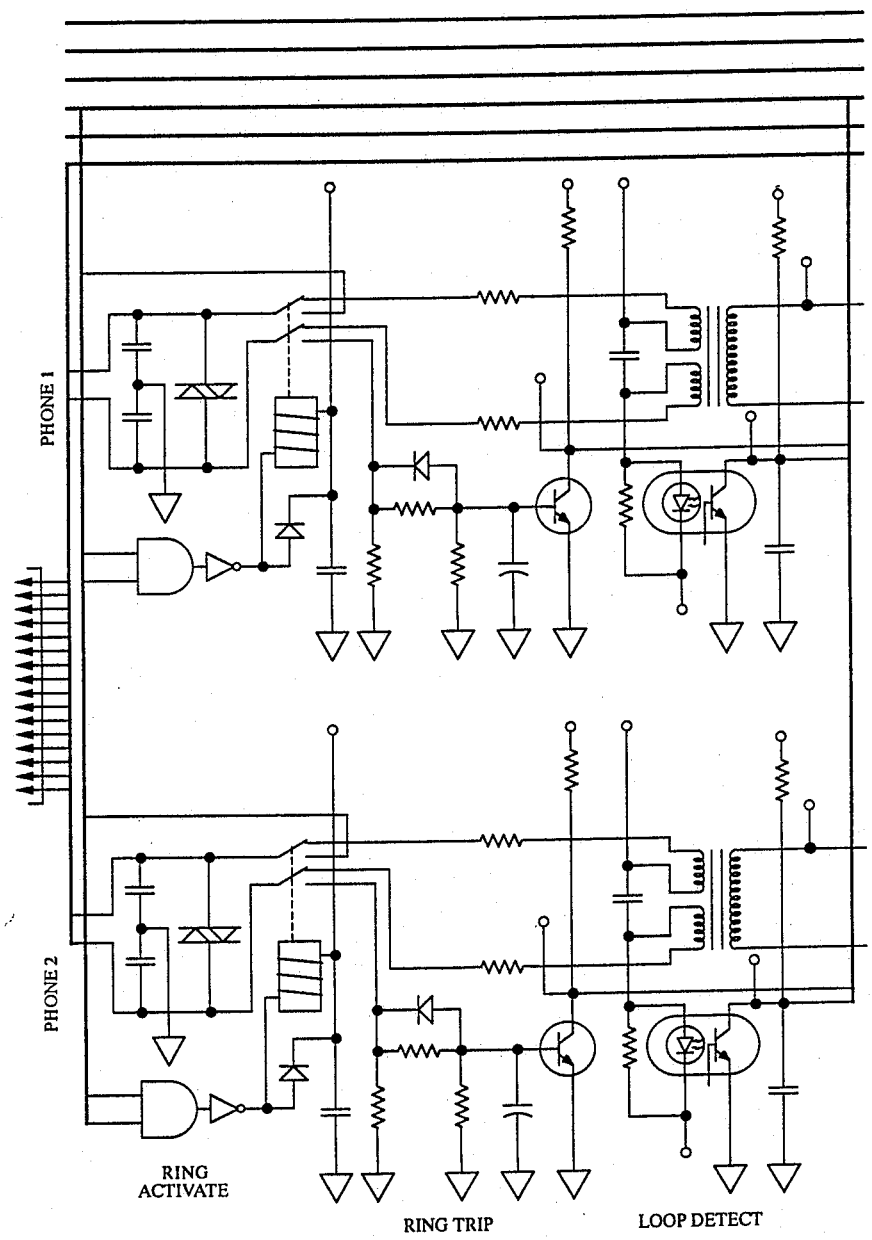
Figure 13B:
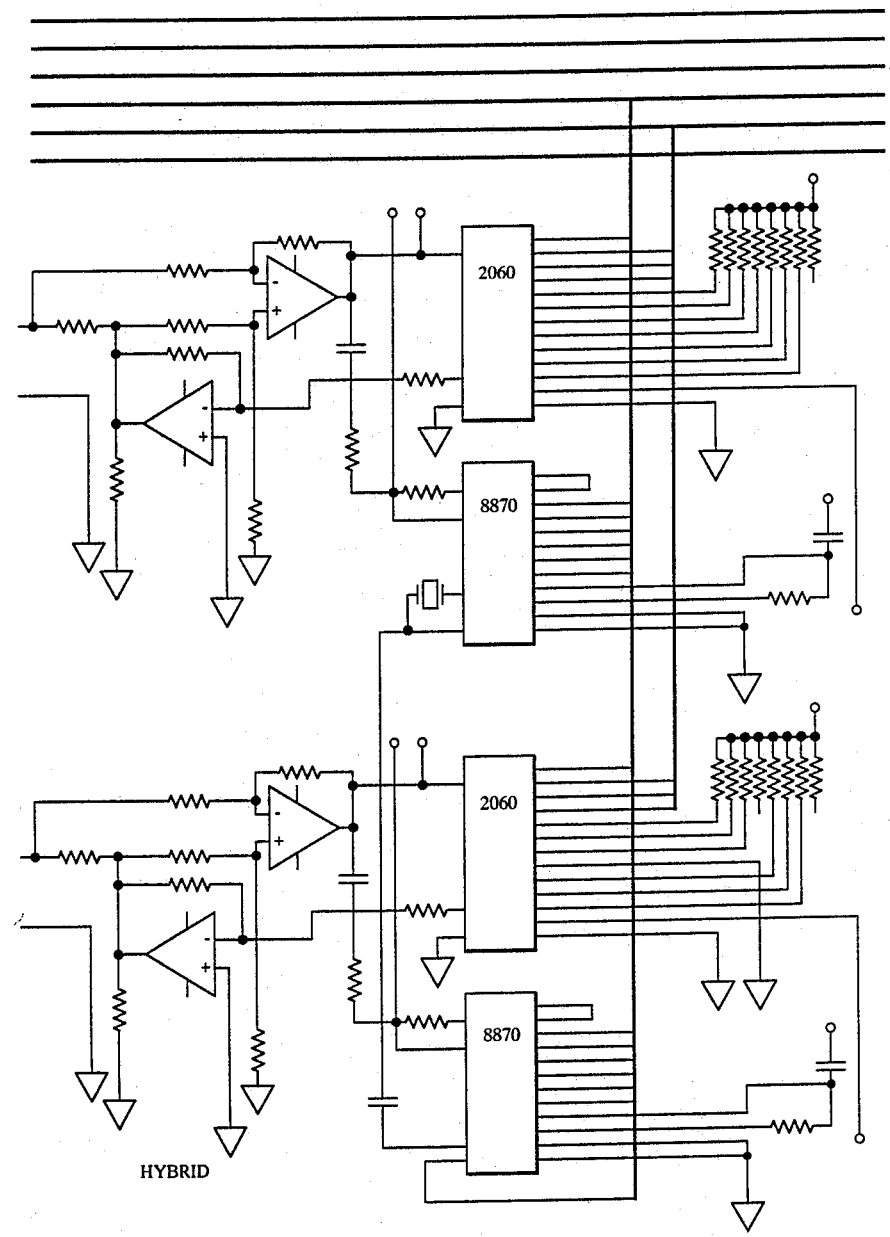
Figure 14A:
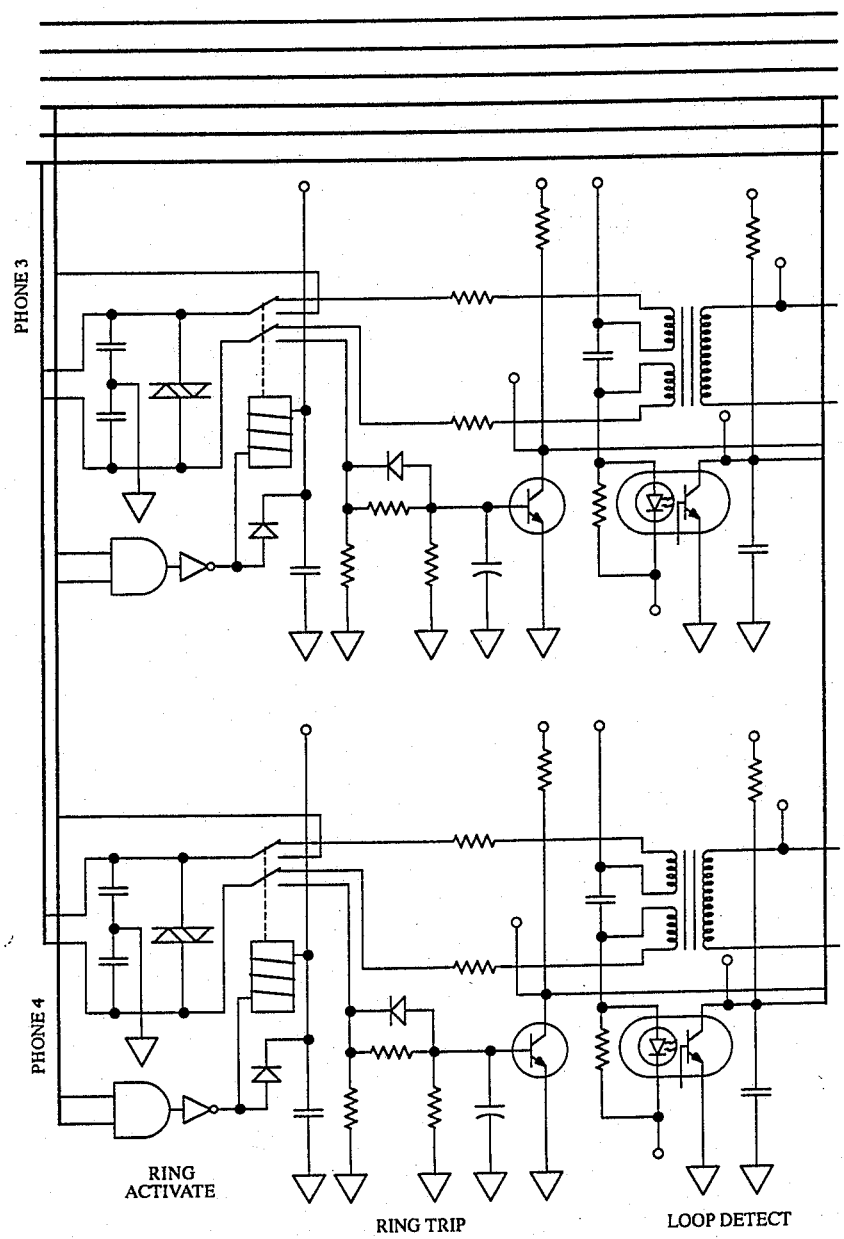
Figure 14B:
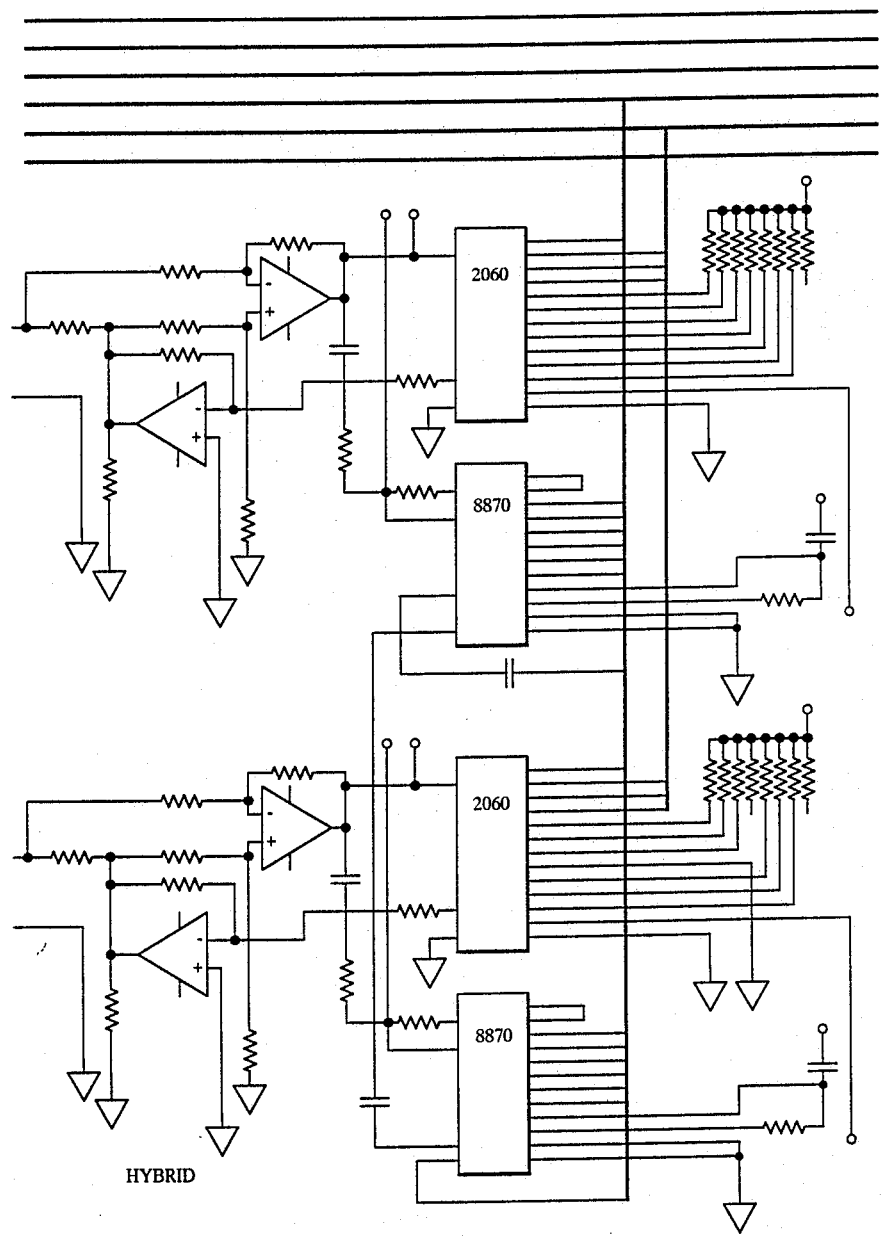
Figure 15A:
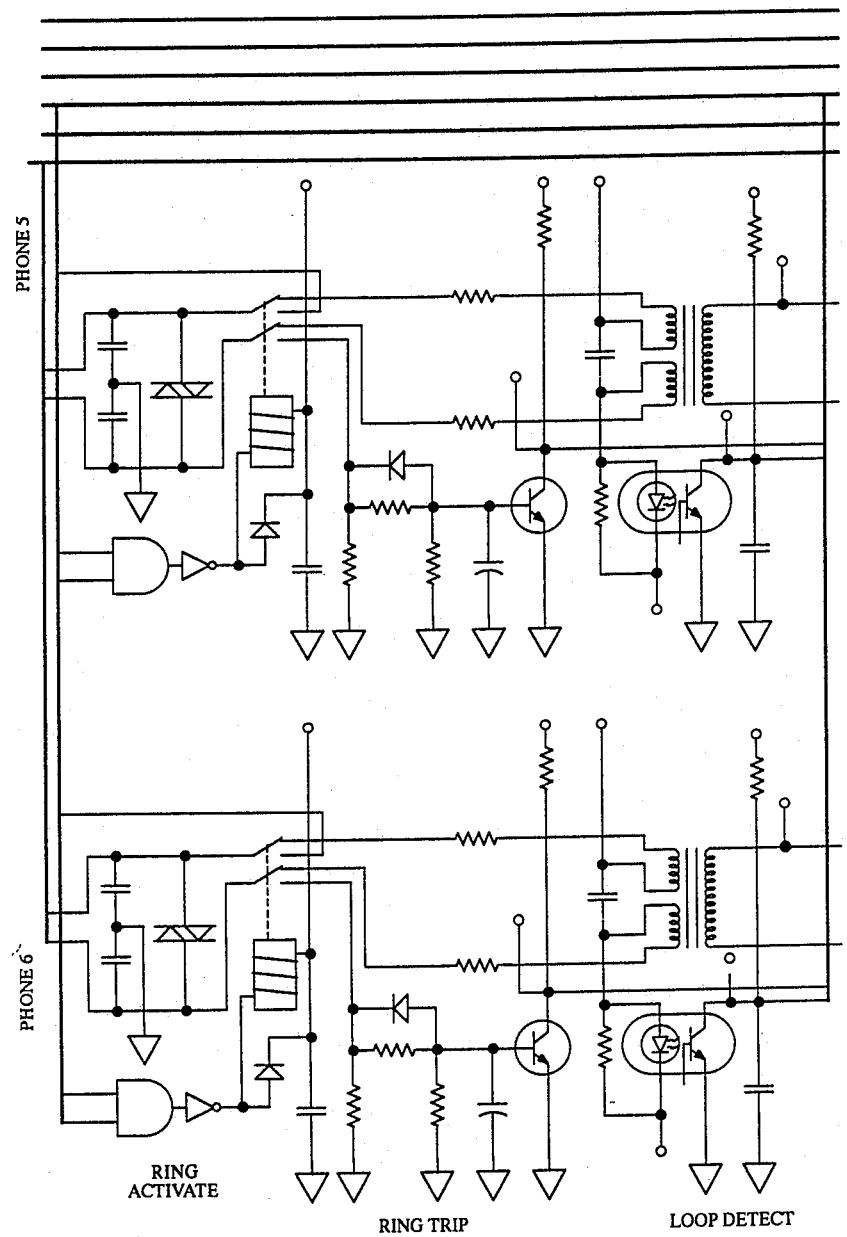
Figure 15B:
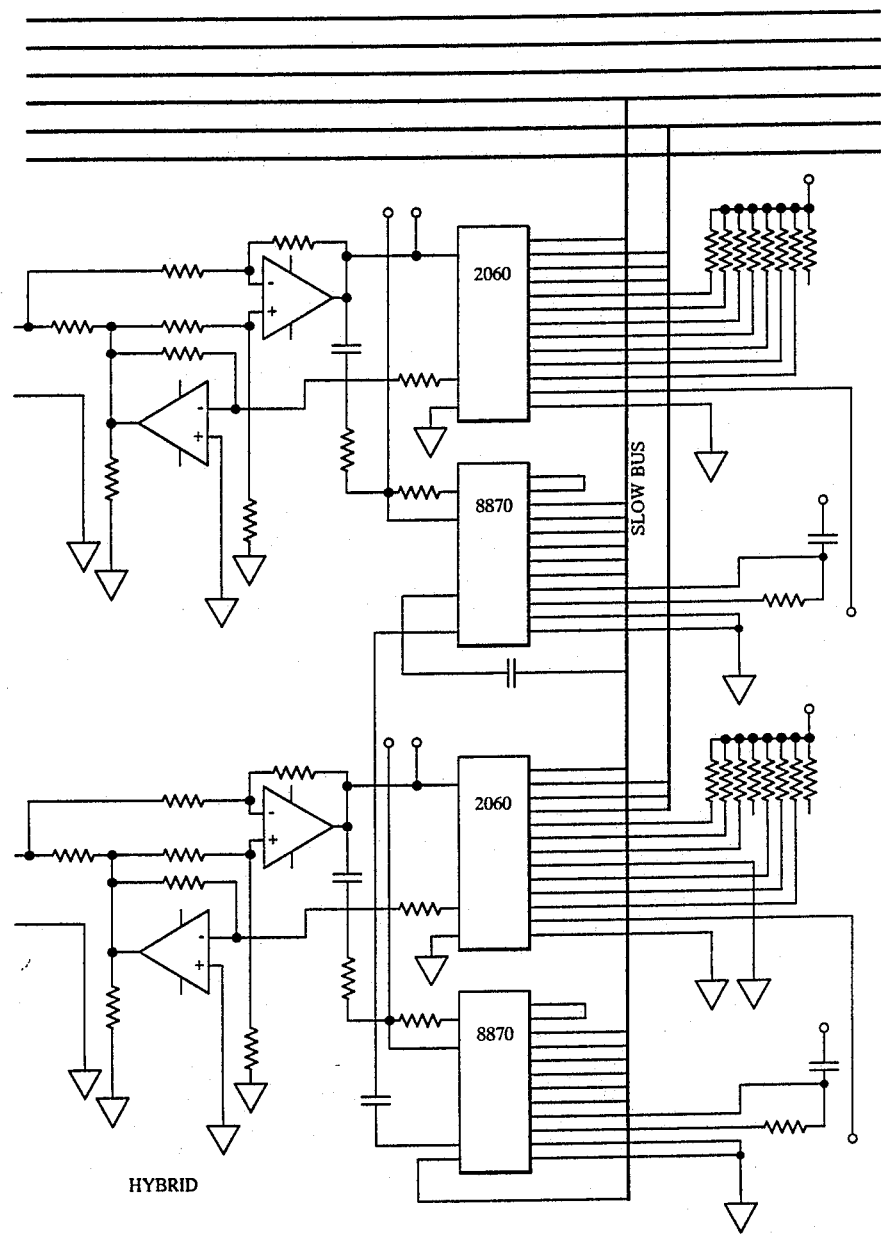
Figure 16A:
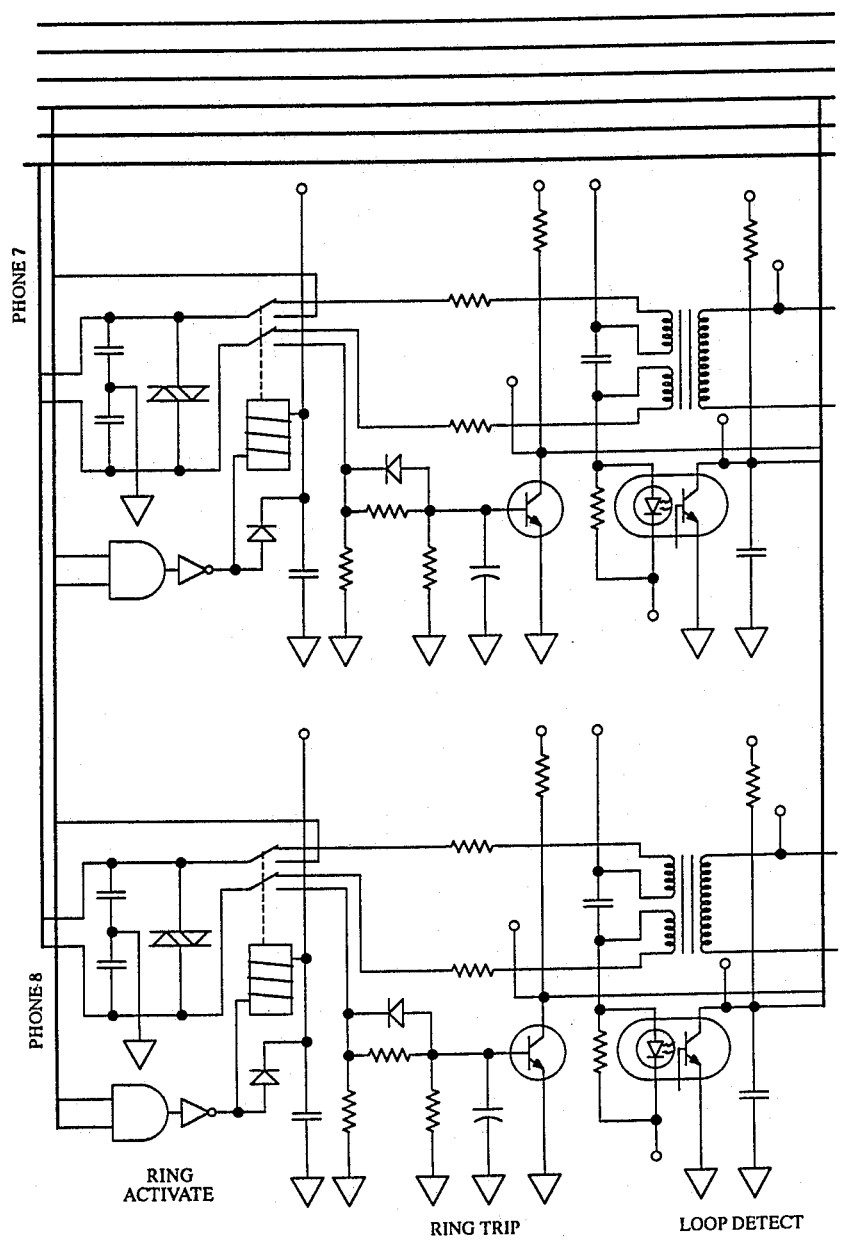
Figure 16B:
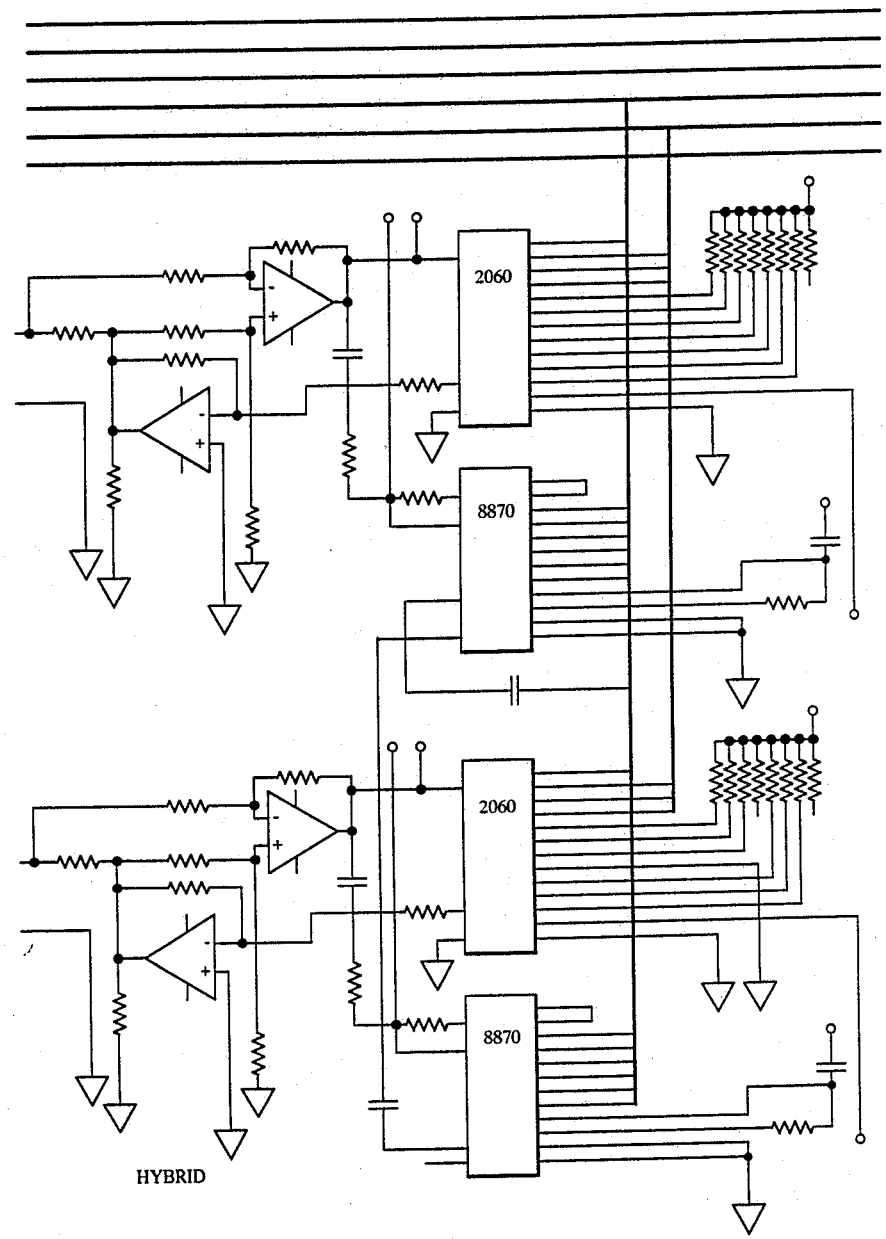
Figure 17:
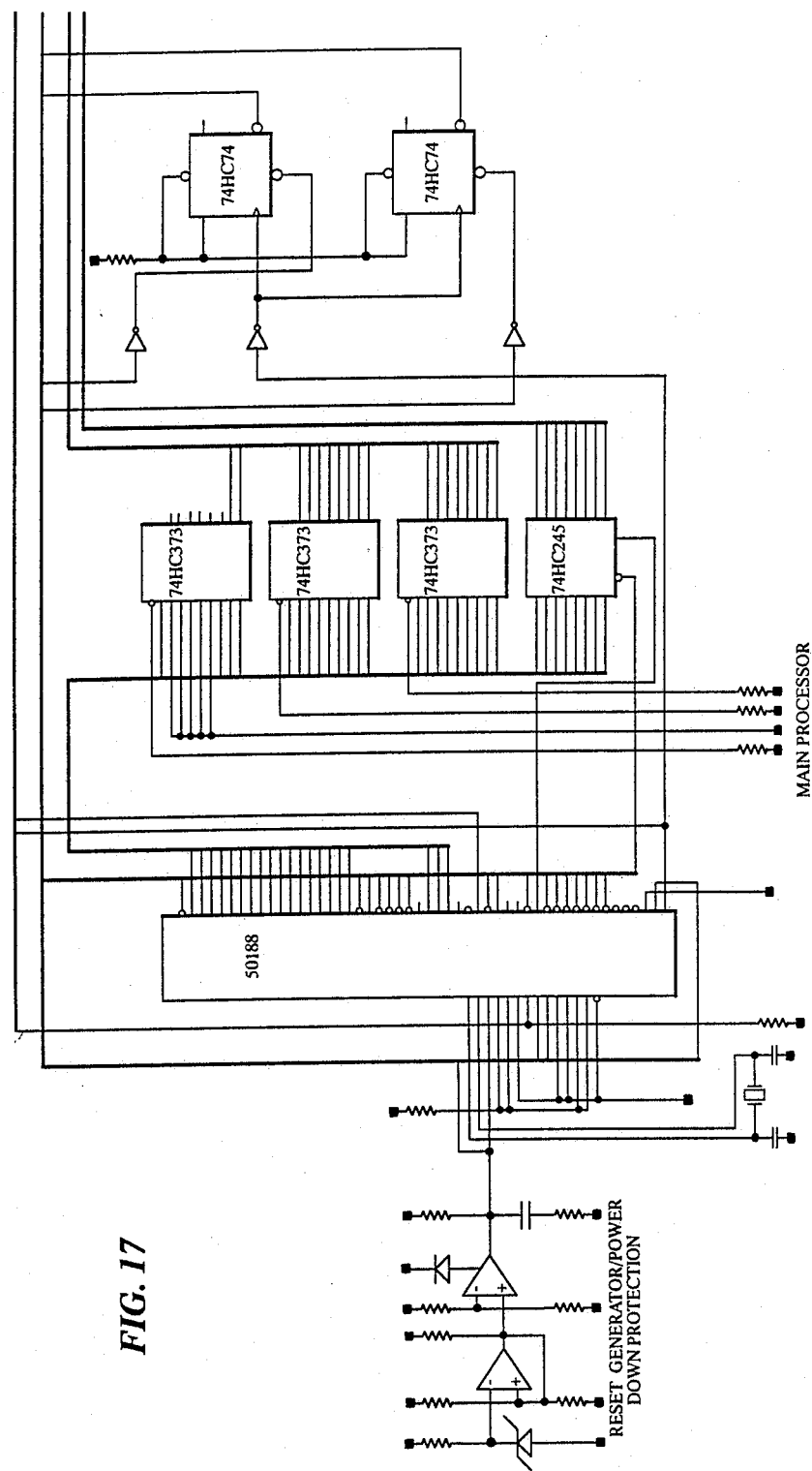
Figure 18:
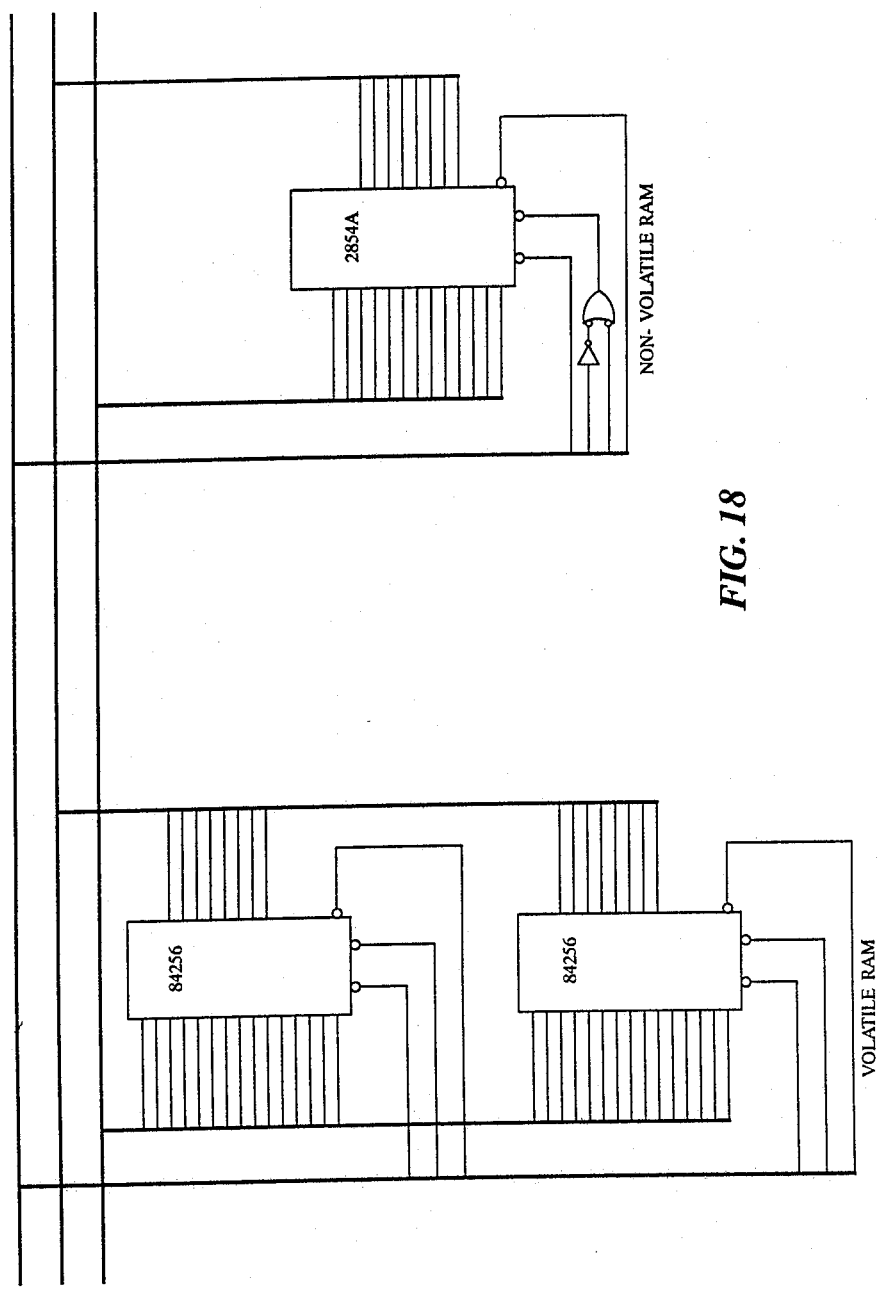
Figure 19:
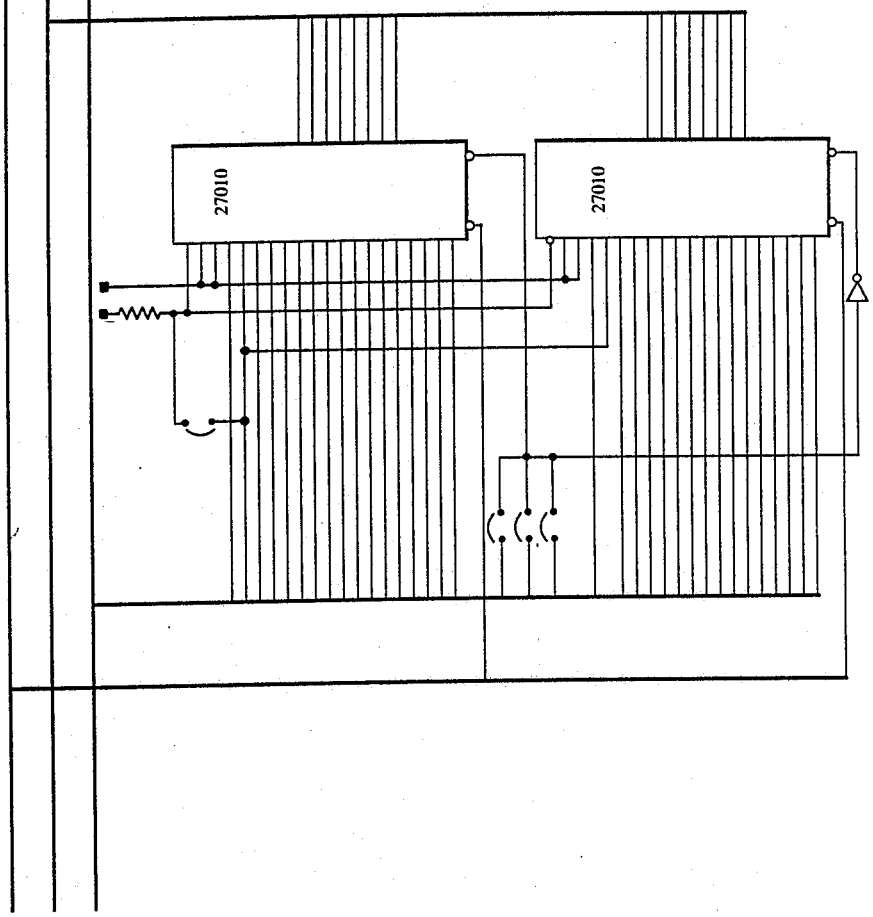
Figure 20:
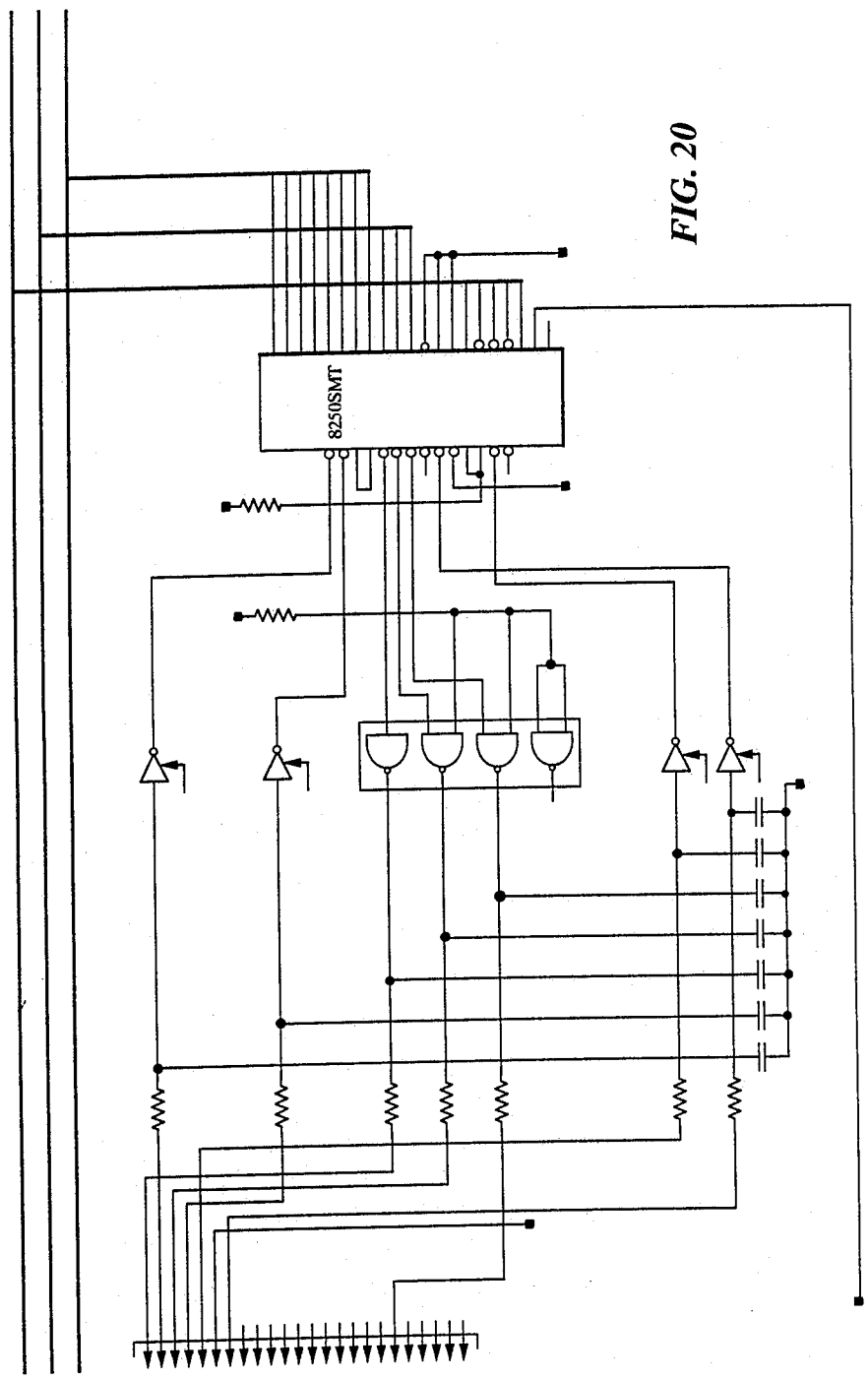
Figure 21:
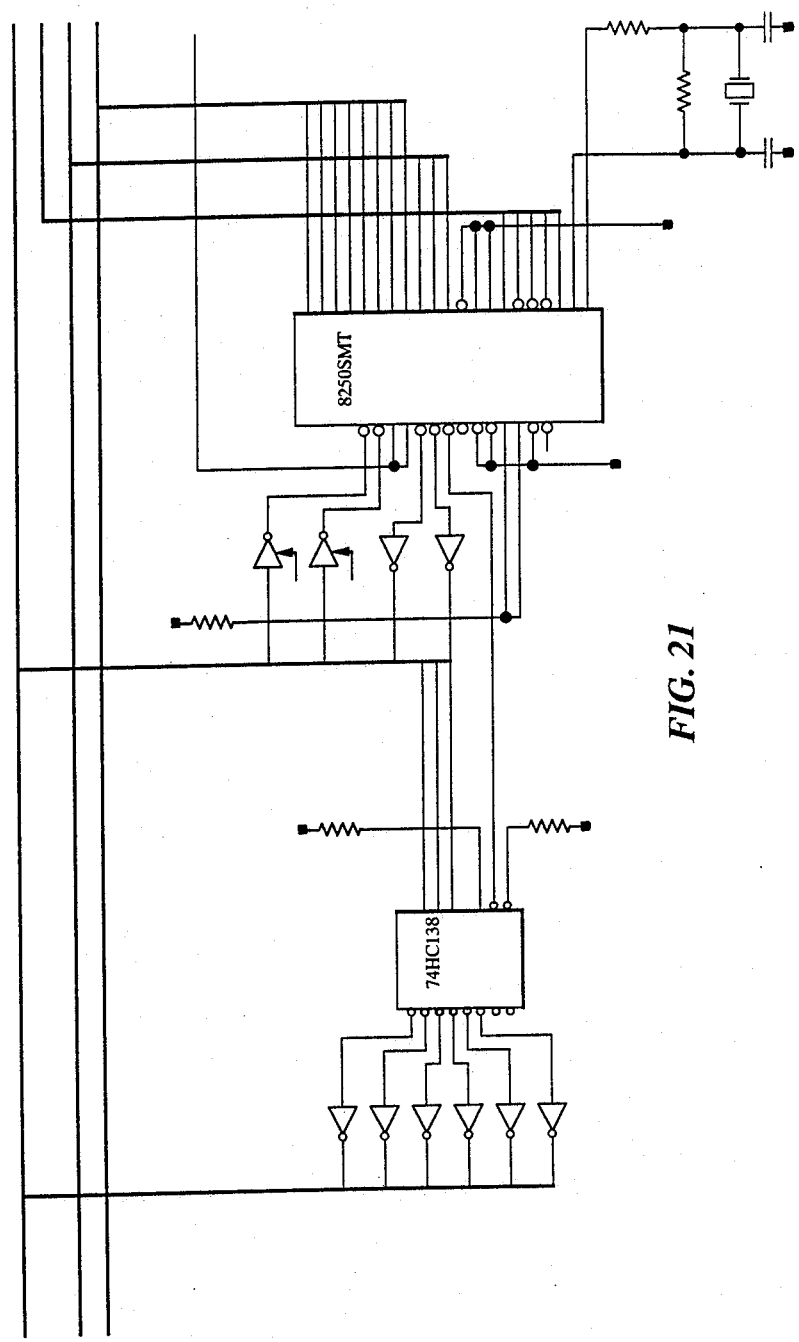
Figure 22:
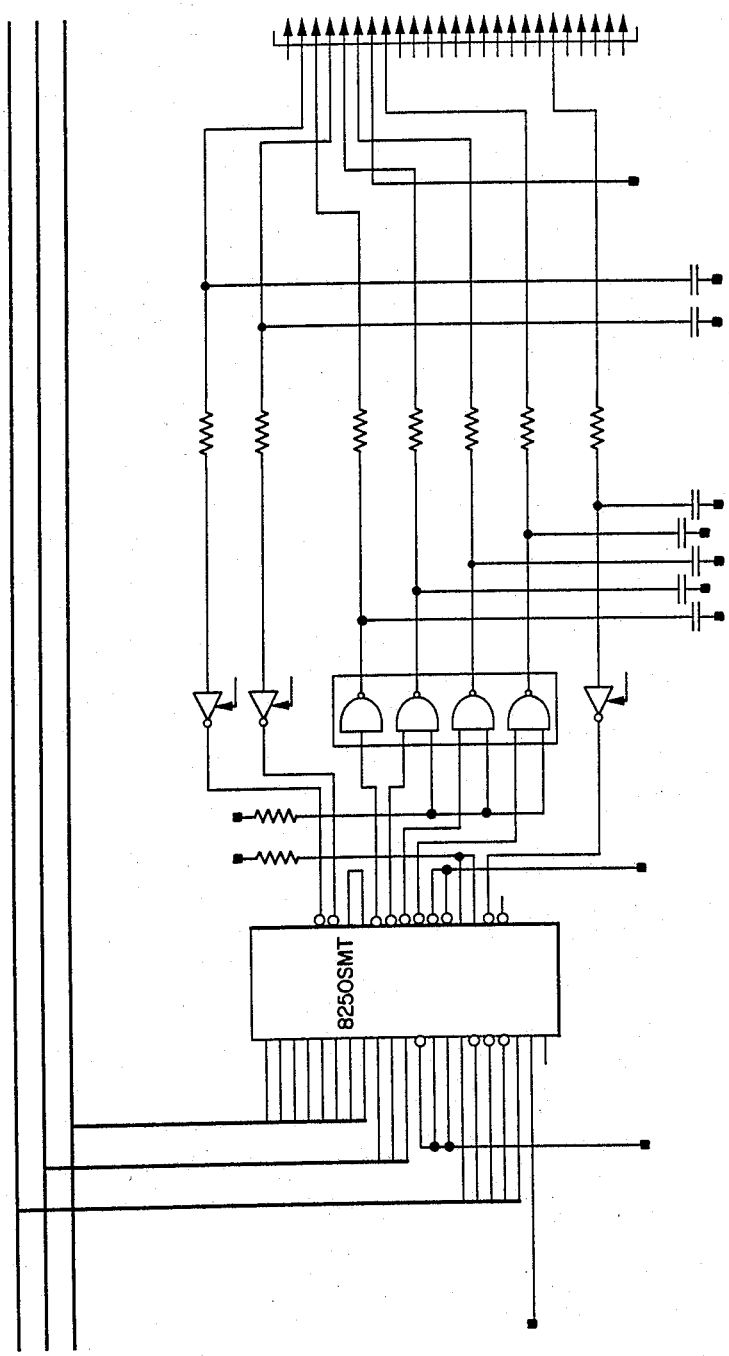
Figure 23:
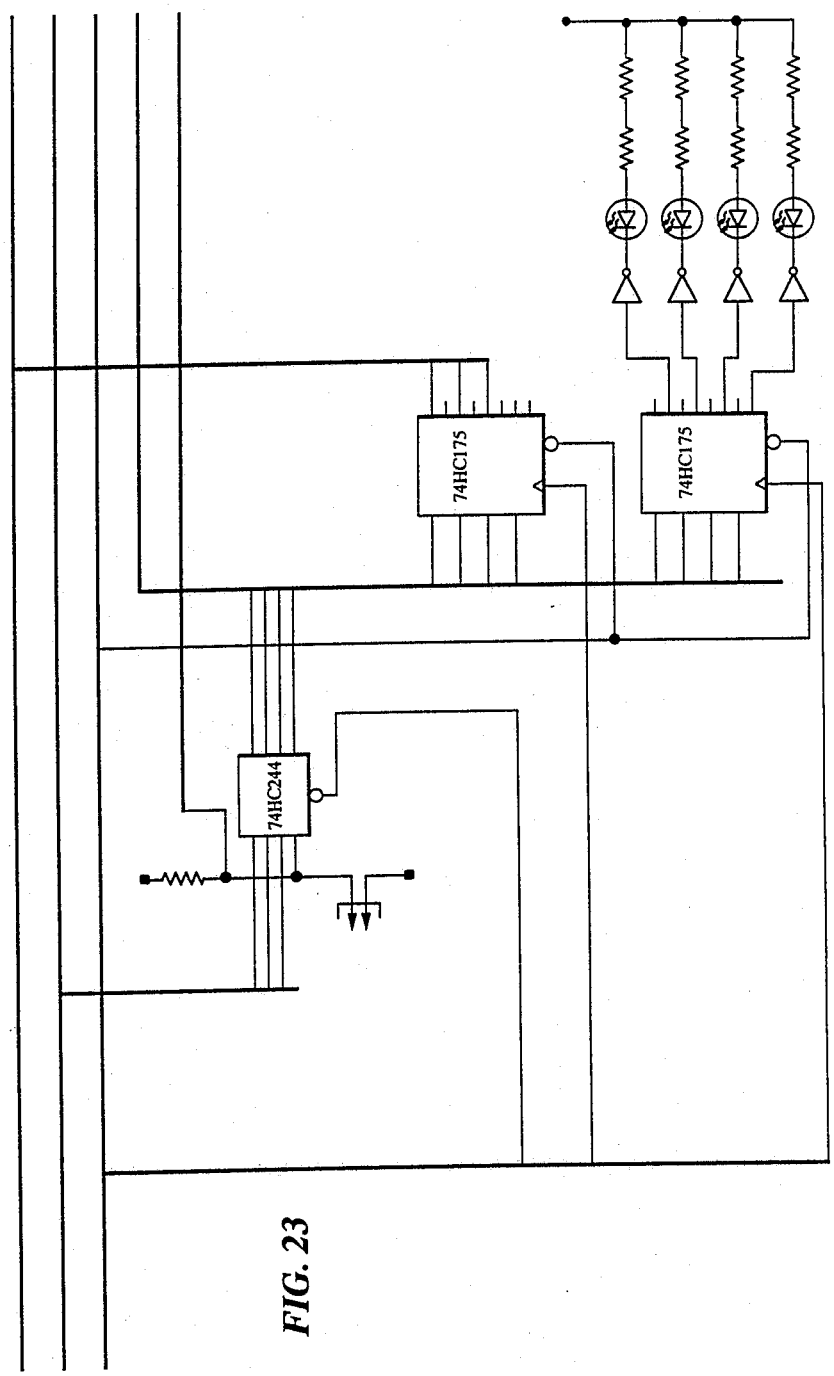

FIG. 2 illustrates an embodiment of a traffic generator adapter (hereinafter TGA) in accordance with the present invention. As can be seen there, the TGA is formed to include a processor board 10, a plurality of daughter boards 12 and a back plane board 14 for interfacing the TGA to an ISDN central office on the one hand and to an analog traffic generator on the other. The TGA is also coupled via the processor board 10 to a D channel monitor 16, preferably through an RS232 port. If desired, the TGA can also be coupled, again through the processor board 10, to other TGAs. FIG. 5 shows an example of coupling a plurality of TGAs to a single D channel monitor, with each of the TGAs being coupled to one another through their respective processor boards 10.

In FIG. 2, the ISDN central office and the traffic generator are not shown since they do not form a direct part of the present invention. It is envisioned that the present invention could be used with a large number of commercially available traffic generators. Solely for purposes of example, it is noted that suitable traffic generators for this purpose are manufactured by Ameritec Corporation in its bulk call generator line. A number of models are put out by Ameritec Corporation as "Model AmlPlus" which can be used in conjunction with the present invention.

Similarly, at the present time, a number of ISDN central offices have been developed which the present invention can be used in conjunction with. For example, Northcom Corporation has developed an ISDN central office called the DMS-100, while AT & T has developed the 5ESS system. The present invention can be used in conjuction with either of these ISDN central office switching arrangements, although, of course, it is not intended to be limited to either of these.

Figure 1:
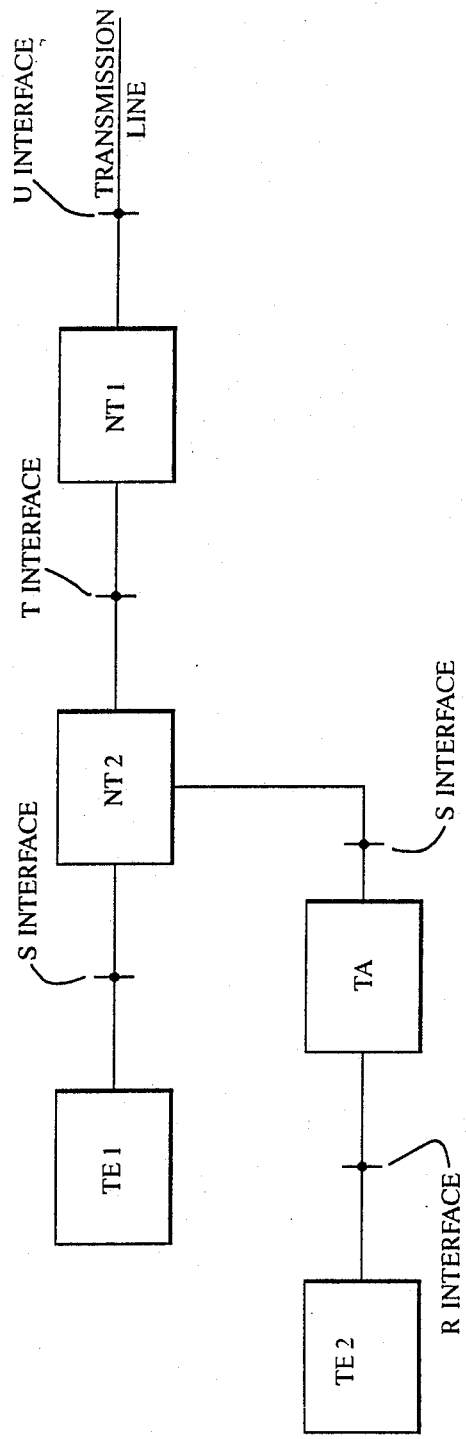

Communication between the daughter boards 12 and the processor board is accomplished by way of a back plane generator board 14. This back plane board 14 is formed of connectors and wiring designed to interconnect the various boards shown in FIG. 2 and to interconnect the TGA to the traffic generator and the ISDN central office switches. Although it is not shown in FIG. 2, the connection between the back plane 14 and the ISDN central office would normally be made either through a NT1 or both through a NT1 and NT2 such as shown in FIG. 1. In other words, the TGA of FIG. 2 would normally be located at either an S interface or a T interface of an ISDN terminal. The traffic generator would then serve effectively as terminal equipment of the TE2 type shown in FIG. 1, while the TGA of FIG. 2 effectively serves as the terminal adapter TA (noting, however, that it could also be located at the T interface rather than being limited to the S interface).

The six daughter boards 12 contain circuitry to simulate an analog central office switch to the analog traffic generator. The daughter boards also contain B channel encoding/decoding processors in a Codec which changes the analog voice signal from the traffic generator into digital data to be transmitted on the B channels (e.g. see FIG. 3). In addition, the daughter boards 12 contain hardware for transmitting and receiving on the "S/T" interface. The processor board 10 contains the necessary equipment for interrogating the D channels of any of the daughter boards, as well as equipment to format it and sent it to the D channel monitor 16. The processor board 10 also handles the interconnection protocol between the respective circuit elements.

As can be seen in FIG. 2, the TGA is designed to handle 48 tip/ring lines from the traffic generator and to provide 24 S interfaces into the ISDN central office. This number, of course, is for purposes of example only since the invention is not intended to be limited to this. Similarly, although each daughter board is shown as operating with eight tip/ring pairs and four S interface pairs, this is also solely for purposes of example. It is, however, noted that the example of 48 tip/ring lines was chosen since this is a suitable number for testing many ISDN central office switches. For example, up to 48 telephone calls can be placed into the central office simultaneously to study how well the ISDN central office replies. Essentially, the testing operator can try to overload the ISDN system to see at what point it stops making connections. At the same time, using the present invention, the D channel operation can also be studied under these conditions.

More specifically, an important aspect of the present invention is the D channel capability of the arrangement. As can be seen in FIG. 2, each of the daughter boards 12 has D channel data lines and D channel monitor enable lines. The daughter boards 12 operate to provide D channel information from their internal processors to the ISDN central office in a manner which will be described in more detail with regard to FIG. 3. The daughter boards also operate to receive, act on and store D channel information from the ISDN central office which can be used for selective D channel monitoring. This selective D channel monitoring is achieved by virtue of the enable lines shown from the processor board 10 to the back plane board 14 and the D monitor enable lines from the back plane board 14 to the individual daughter boards. A command signal from the processor board 10 serves to select individual ones of the daughter boards 12 for readout of the stored D channel information. This selected D channel information can then be provided from the selected daughter board 12 to the D channel monitor 16 through the processor board 10, as will be discussed in further detail hereinafter.

Figure 3:
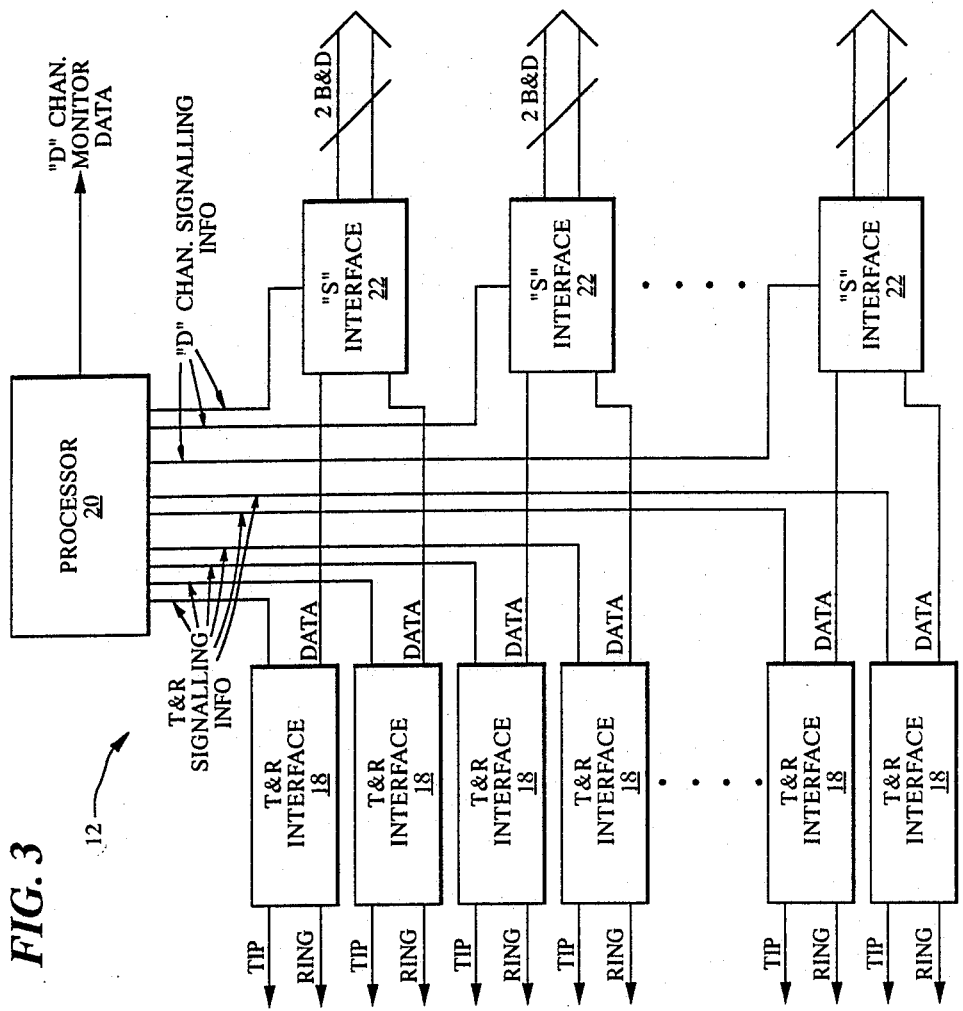
FIG. 3 is a block diagram showing an individual daughter board of the traffic generator adapter of FIG. 2.

FIG. 3 shows an individual daughter board 12 of FIG. 2. As can be seen there, each daughter board 12 includes a plurality of tip/ring interfaces (hereinafter T & R interface) 18, a processor 20 and a plurality of S interfaces 22. The T & R interfaces 18 receive tip and ring signals from the traffic generator, and also provide return tip and ring signals to the traffic generator (from the ISDN central office through the TGA).

Figure 4:
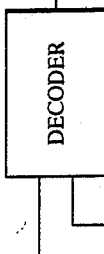
FIG. 4 is a block diagram of a tip/ring interface of the traffic generator adapter of FIG. 2.

Basically, the T & R interface 18 handles the analog data and signalling to and from the traffic generator. In order to do this, it is capable of detecting conditions such as off hook, on hook, and dialing from the traffic generator and translating these into signals to the processor 20. In return it receives signals from the processor 20 and translates them into signals for the traffic generator such as ringing. More specifically, as shown in FIG. 4, the T & R interface 18 contains several sensing circuits to detect commands from the traffic generator. These signals can include on hook, off hook, and DTMF dialing. Whenever these signals are detected, a message is sent to the processor 20 through an I/O port. The processor 20 passes this message on to the switch through the S interface. Subsequently, one of the processors 20 can respond to a command from the switch to command a T & R interface through an I/O port to start ringing to signal the traffic generator that it should answer the call.

When the processor 20 receives these signals from the T & R interface 18, it generates equivalent D channel messages to the central office switch through the S interface 22 and handles all the handshakes needed to establish the proper central office action. It also will translate commands from the central office into action to be produced by the T & R interface 18. In addition to handling the messaging back and forth between the analog traffic generator and the digital ISDN switch, the processor 20 formats the D channel traffic and stores it to be available to be sent to the processor board 10 when the processor board 10 requests it.

The S interface 22 combines the digitized analog data from two T & R sections with the D channel data produced by the processor into the ISDN standard 2B+D S or T interface to be sent to the central office. It also receives such ISDN signals from the central office and provides B channel information to the T & R interfaces 18 and D channel signals to the processor 20.

A typical sequence of operation for the TGA of FIG. 3 would be as follows. The traffic generator would go off hook. This would be detected by the T & R interfaces 18 of a daughter board and a signal would be sent to the processor 20 that a connection is desired. By means of D channel messages, the TGA would request a connection from the ISDN central office switch. The ISDN switch would then respond with a connect message and dial tone which would be sent to the traffic generator through the TGA. Upon receipt of dial tone, the traffic generator would begin dialing. The DTMF tones would be detected by a T & R interface, sent to a processor 20 and then to the central office ISDN switch on the D channel. The ISDN switch would complete the call and send a message to another T & R interface 18 to start ringing. The traffic generator would detect ringing and go off hook to answer to call. The second T & R interface would detect the off hook and signal the switch to complete the call. Once this is done, the traffic generator would send tones end-to-end to test the quality of the connection and then hang up. The T & R interface 18 would detect the on hook condition and signal the switch to tear down the call.

As noted previously, an important aspect of the present invention is the fact that it permits selective monitoring of individual D channel information within the TGA using, if desired, a single D channel monitor 16. This can even be the case if a plurality of TGAs are coupled together in the manner shown in FIG. 5. In other words, even though there may be hundreds of S interface lines between the TGA system of FIG. 5 and ISDN central office, the present invention allows a testing operator to isolate on a single D channel line within a particular daughter board 12 of one of the individual TGAs. In effect, the present invention allows addressing particular D channel lines. The reason for the importance of this is that although an analog traffic generator coupled to the TGA of the present invention is capable of determining if an ISDN switch is operating up to specifications, it has no way of assisting troubleshooting if a problem is found without the D channel monitoring feature. The D channel monitor 16 analyzes the signalling traffic between the adapter and the ISDN switch to assist in determining why the proper connections are not taking place. It does this by displaying messages being passed between the two devices as the call progresses. By interpreting these messages, a trained operator can determine the cause of failure. Since there are many D channels in the TGA, the arrangement of permitting the processor boards 10 to selectively enable processors 20 of the daughter boards 12 is included to select which D channel is to be monitored.

As noted previously, the selection of the desired D channel line is controlled through the processor boards 10 of each of the TGAs. More specifically, by controlling an enable line to each of the six daughter boards 12, an RS232 port is enabled on a particular daughter board. When this is enabled, D channel data is placed on a bus to be received and translated by the processor board 10. For communication with another box, the D channel monitor 16 precedes the request for the data with a box number. If this is anything other than zero, the box number is decremented by one and relayed directly to the next box in the chain. This decrementing and relaying is continued by each box until the address reaches zero and that box responds with data from the requested D channel.

As described above, the present invention provides an arrangement which allows both exercising both ISDN central office switches with commercially available analog traffic generators and selective D channel monitoring of individual D channel lines within the TGA. With regard to this, it is noted that the present invention is not intended to be limited to a particular D channel monitor 16 since a variety of D channel testing equipment could be used. In other words, the present invention is not intended to be limited to a particular D channel test program. However, one example of a D channel monitor that could be used with the present invention is described in U.S. patent application Ser. No. 192,174, filed on even date herewith by the same inventors as the present application, and entitled "D Channel Monitor", which is herein incorporated by reference. It is noted that this related application includes an example of software specifications that could be used for such D channel monitoring.

Also, it is to be noted that the processor boards 10 and the processors 20 described above can be any suitable processors for carrying out the functions described. For example, Intel 80188 microprocessors could be used throughout, although the invention is not limited to this. Regarding the software for these operations, essentially the TGA of the present invention operates in a manner similar to a terminal adapter for converting a plurality of analog signals from an analog traffic generator into ISDN signals for an ISDN central office. As such, the processors 10 and 20 can operate using known terminal adapter software programs modified to permit the selective accessing by the D channel monitor 16 to individual D channel lines through the processor boards 10 and the processor 20, as described above.

Although the invention has been described with regard to use in permitting testing of ISDN central office switches using analog traffic generators, it is to be noted that the present invention could also be useful for other purposes. For example, the present invention could be used, if desired, as an adapter to permit the connection of a large number of analog telephones (or other analog equipment) to an ISDN central office in place of using a larger number of individual terminal adapters. The advantage of this over using commercially available terminal adapters would be that the present invention permits the isolation of individual D channel lines for testing using a single D channel monitor, as discussed above.

FIGS. 6 to 24 provide detailed schematic drawings for the elements illustrated in FIGS. 2 to 6. These figures are labelled to identify the particular circuit elements of FIGS. 2 to 6 in the specification which are illustrated. FIGS. 6 to 24 identify integrated circuits and other electrical and electronic elements with conventionally utilized industrial identification.

It is to be understood that the above-described arrangements are simply illustrative of the application of the principles of this invention. Numerous other arrangements may be readily devised by those skilled in the art which embody the principles of the invention and fall within its spirit and scope.

What is claimed is:

1. An integrated services digital network (ISDN) traffic generator adapter for coupling an analog traffic generator which produces a plurality of commands and analog telephone signals to an ISDN switch, comprising:

a plurality of first circuits for coupling said analog traffic generator to said ISDN switch, for two-way communication therebetween, wherein each of said first circuits includes a plurality of tip/ring interface circuits, a processor and a plurality of S interface circuits, wherein each of said tip/ring interface circuits includes means for detecting commands from said analog traffic generator and providing a message to said processor upon receiving said commands, each of said tip/ring interface circuits further including means for converting analog telephone signals from said analog traffic generator into ISDN B channel signals to be provided to one of said S interface circuits and means for converting B channel signals received from one of said S interface circuits into analog tip/ring signals to be provided to said analog traffic generator, wherein said processor includes means for receiving said messages from said tip/ring interface circuits and generating D channel signals to be provided to one of said S interface circuits, said processor further including means for receiving and storing D channel signals from said ISDN switch through said S interface, and wherein each of said S interface circuits includes means for combining B channel signals received from a tip/ring interface with D channel signals received from said processor to provide an ISDN signal to said ISDN switch and means for receiving ISDN signals from said switch and providing B channel signals based thereon to one of said tip/ring interface circuits and means for providing D channel signals based thereon to said processor;

a second processor circuit coupled to said plurality of first circuits, wherein said second processor circuit includes means for selectively addressing individual ones of said processors of said plurality of first circuits; and D channel monitoring means coupled to said second processor to control said second processor to select predetermined ones of said processors of said first circuit so that predetermined D channel information from said ISDN switch stored in said selected processors of said first circuits can be individually monitored by said D channel monitor through said second processor circuit.

2. An integrated services digital network (ISDN) traffic generator adapter according to claim 1, wherein said D-channel monitoring means includes means for allowing examination of the contents of messages passing along the D channel of said two-way communication links.

3. An integrated services digital network (ISDN) traffic generator adapter for coupling an analog traffic generator which produces a plurality of commands and analog telephone signals to an ISDN switch, comprising:

a plurality of first circuits for providing a plurality of two-way communication links between the analog traffic generator and the ISDN switch, wherein each of said first circuits includes means for converting the analog telephone signals from the analog traffic generator into a plurality of ISDN signals, including B channel information and D channel information, for said ISDN switch, and means for converting a plurality of ISDN signals from the ISDN switch, including B channel information and D channel information, into analog telephone signals for said analog traffic generator, so that each two-way communication link provides a particular ISDN signal to the ISDN switch in response to a particular analog signal from the analog traffic generator and a particular analog telephone signal for the analog traffic generator in response to a particular ISDN signal from the ISDN switch;

a processor coupled to said plurality of first circuits, including means for selectively addressing individual ones of said plurality of first circuits; and D channel monitor means coupled to said processor for monitoring D channel communication between the first circuits and the ISDN switch, including means for selectively monitoring D channel communication between the first circuits and the ISDN switch for individual two-way communication links between the analog traffic generator and the ISDN switch in accordance with the selection of one of the first circuits by the processor.

4. An integrated services digital network (ISDN) traffic generator adapter according to claim 3, wherein said D-channel monitor means includes means for allowing examination of the contents of messages passing along the D channel of said two-way communication links.

5. An apparatus for generating a plurality of ISDN traffic signals for testing an ISDN switch comprising:

a plurality of first circuits coupled to said ISDN switch including means for generating a plurality of two-way communication links between the ISDN switch and the first circuits, wherein each two-way communication link includes a first ISDN signal including B channel information and D channel information from a first circuit to the ISDN switch and a second ISDN signal including B channel information and D channel information from the ISDN switch to the first circuit;

a processor coupled to said plurality of first circuits including means for selectively addressing individual ones of said first circuits; and D channel monitoring means coupled to said processor for monitoring D channel communication between said first circuits and said ISDN switch including means for selectively monitoring individual two-way communication links between the first circuits and said ISDN switch in accordance with the selection of said first circuit by the processor so that a testing operator can isolate on a single D channel, from among said plurality of two-way communication links, for monitoring the D channel information on said single D channel.

6. An apparatus according to claim 5, wherein a single D-channel monitoring means is provided and wherein said selective addressing means of said processor permits said single D-channel monitoring means to be used for individually monitoring D channels from among said plurality of two-way communication links.

7. An apparatus according to claim 5, wherein said D-channel monitoring means includes means for allowing examination of the contents of messages passing along the D channels of said two-way communication links.

8. An integrated services digital network (ISDN) traffic generator adapter for coupling an analog traffic generator which produces a plurality of commands and analog telephone signals to an ISDN switch, comprising:

a plurality of first circuits for coupling said analog traffic generator to said ISDN switch, for two-way communication therebetween, wherein each of said first circuits includes a plurality of tip/ring interface circuits, a processor and a plurality of S interface circuits, wherein each of said tip/ring interface circuits includes means for detecting commands from said analog traffic generator and providing a message to said processor upon receiving said commands, each of said tip/ring interface circuits further including means for converting analog telephone signals from said analog traffic generator into ISDN B channel signals to be provided to one of said S interface circuits and means for converting B channel signals received from one of said S interface circuits into analog tip/ring signals to be provided to said analog traffic generator, wherein said processor includes means for receiving said messages from said tip/ring interface circuits and generating D channel signals to be provided to one of said S interface circuits, said processor further including means for receiving and storing D channel signals from said ISDN switch through said S interface, and wherein each of said S interface circuits includes means for combining B channel signals received from a tip/ring interface with D channel signals received from said processor to provide an ISDN signal to said ISDN switch and means for receiving ISDN signals from said switch and providing B channel signals based thereon to one of said tip/ring interface circuits and means for providing D channel signals based thereon to said processor;

a second processor circuit coupled to said plurality of first circuits, wherein said second processor circuit includes means for selectively addressing individual ones of said processors of said plurality of first circuits; and means coupled to said second processor for monitoring predetermined operation characteristics of a selected processor of said first circuits in accordance with the selection of said processor of said first circuits by said second processor.

9. An integrated services digital network (ISDN) traffic generator adapter for coupling an analog traffic generator which produces a plurality of commands and analog telephone signals to an ISDN switch, comprising:

a first circuit for coupling said analog traffic generator to said ISDN switch, for two-way communication therebetween, wherein said first circuit includes a plurality of tip/ring interface circuits, a processor and a plurality of S interface circuits, wherein each of said tip/ring interface circuits includes means for detecting commands from said analog traffic generator and providing a message to said processor upon receiving said commands, each of said tip/ring interface circuits further including means for converting analog telephone signals from analog traffic generator into ISDN B channel signals to be provided to one of said S interface circuits and means for converting B channel signals received from one of said S interface circuits into analog tip/ring signals to be provided to said analog traffic generator, wherein said processor includes means for receiving said messages from said tip/ring interface circuits and generating D channel signals to be provided to said S interface circuits, said processor further including means for receiving and storing D channel signals from the ISDN switch through said S interface, and wherein each of said S interface circuits includes means for combining B channel signals received from a tip/ring interface with D channel signals received from said processor to provide an ISDN signal to said ISDN switch and means for receiving ISDN signals from said switch and providing B channel signals based thereon to one of said tip/ring interface circuits and means for providing D channel signals based thereon to said processor; and a D-channel monitor coupled to said processor for selecting and monitoring D channel information on predetermined two-way ISDN communication links between said first circuit and said ISDN switch.

10. An integrated services digital network (ISDN) traffic generator adapter according to claim 9, wherein said D-channel monitor includes means for allowing examination of the contents of messages passing along the D channel of said two-way communication links.

* * * * *